(12) United States Patent
Laluet et al.

(10) Patent No.: US 10,618,465 B2
(45) Date of Patent: Apr. 14, 2020

(54) VEHICLE LUMINOUS GLAZING UNIT AND THE MANUFACTURE THEREOF

(71) Applicant: SAINT-GOBAIN GLASS FRANCE, Courbevoie (FR)

(72) Inventors: Jean-Yves Laluet, Paris (FR); Pascal Bauerle, Roye (FR); Emmanuelle Artzner, Antony (FR); Cédric Brochier, Lyons (FR); Delphine Chevalier, Valence (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 190 days.

(21) Appl. No.: 15/759,030

(22) PCT Filed: Sep. 9, 2016

(86) PCT No.: PCT/FR2016/052271
§ 371 (c)(1),
(2) Date: Mar. 9, 2018

(87) PCT Pub. No.: WO2017/042508
PCT Pub. Date: Mar. 16, 2017

(65) Prior Publication Data
US 2018/0297515 A1 Oct. 18, 2018

(30) Foreign Application Priority Data
Sep. 11, 2015 (FR) ...................... 1558499

(51) Int. Cl.
*B60Q 3/208* (2017.01)
*B32B 17/06* (2006.01)
(Continued)

(52) U.S. Cl.
CPC ............ *B60Q 3/208* (2017.02); *B32B 17/067* (2013.01); *B32B 17/10036* (2013.01);
(Continued)

(58) Field of Classification Search
CPC ............ F21V 2200/10; F21V 2200/15; F21V 2200/17; F21V 2200/20; G09F 2013/049;
(Continued)

(56) References Cited

U.S. PATENT DOCUMENTS

2010/0053990 A1* 3/2010 Brochier ............... G02B 6/001
362/556
2015/0146286 A1 5/2015 Hagen et al.

FOREIGN PATENT DOCUMENTS

EP 0 844 075 A1 5/1998
FR 1 357 461 A 4/1964
(Continued)

OTHER PUBLICATIONS

International Search Report as issued in International Patent Application No. PCT/FR2016/052271, dated Nov. 30, 2016.

*Primary Examiner* — Anh T Mai
*Assistant Examiner* — Steven Y Horikoshi
(74) *Attorney, Agent, or Firm* — Pillsbury Winthrop Shaw Pittman LLP

(57) ABSTRACT

A vehicle, in particular road vehicle, luminous glazing unit includes a laminated glazing unit and a first light source at the periphery of the glazing unit, a luminous woven textile including warp yarns, weft yarns and optical fibers, the optical fibers being capable of emitting light sideways, the optical fibers protruding from a first edge face of the laminated glazing unit, and the light source is connected to the first free ends of the optical fibers. The woven textile has openings between the warp yarns, the weft yarns and the optical fibers, lets a fraction of the solar radiation through via the openings and has a clarity C of at least 75%. The luminous woven textile is in optical contact with the faces F2 and F3 of the glass panes of the laminated glazing unit.

21 Claims, 10 Drawing Sheets

(51) Int. Cl.
  *B32B 17/10* (2006.01)
  *B62D 25/06* (2006.01)
  *B60Q 3/64* (2017.01)
  *B60Q 3/62* (2017.01)
  *B60Q 3/74* (2017.01)
  *B60J 1/00* (2006.01)
  *F21Y 115/10* (2016.01)
  *F21W 106/00* (2018.01)

(52) U.S. Cl.
  CPC .. *B32B 17/10174* (2013.01); *B32B 17/10541* (2013.01); *B32B 17/10761* (2013.01); *B32B 17/10788* (2013.01); *B60J 1/001* (2013.01); *B60Q 3/62* (2017.02); *B60Q 3/64* (2017.02); *B60Q 3/745* (2017.02); *B62D 25/06* (2013.01); *B32B 2250/04* (2013.01); *B32B 2262/101* (2013.01); *B32B 2305/188* (2013.01); *B32B 2605/08* (2013.01); *F21V 2200/10* (2015.01); *F21W 2106/00* (2018.01); *F21Y 2115/10* (2016.08)

(58) Field of Classification Search
  CPC ..... B60J 1/001; D03D 15/00; D03D 15/0011; B32B 17/067; G02B 6/001; E06B 2009/247; B60Q 3/208; B60Q 3/62; B60Q 3/64
  See application file for complete search history.

(56) References Cited

FOREIGN PATENT DOCUMENTS

| | | |
|---|---|---|
| FR | 2 859 737 A1 | 3/2005 |
| FR | 2 899 852 A3 | 10/2007 |
| WO | WO 04/025334 A2 | 3/2004 |
| WO | WO 2005/026423 A2 | 3/2005 |
| WO | WO 2008/035010 A1 | 3/2008 |
| WO | WO 2008/062141 A2 | 5/2008 |
| WO | WO 2008/087339 A2 | 7/2008 |
| WO | WO 2012/098330 A1 | 7/2012 |
| WO | WO 2014/202868 A1 | 12/2014 |

\* cited by examiner

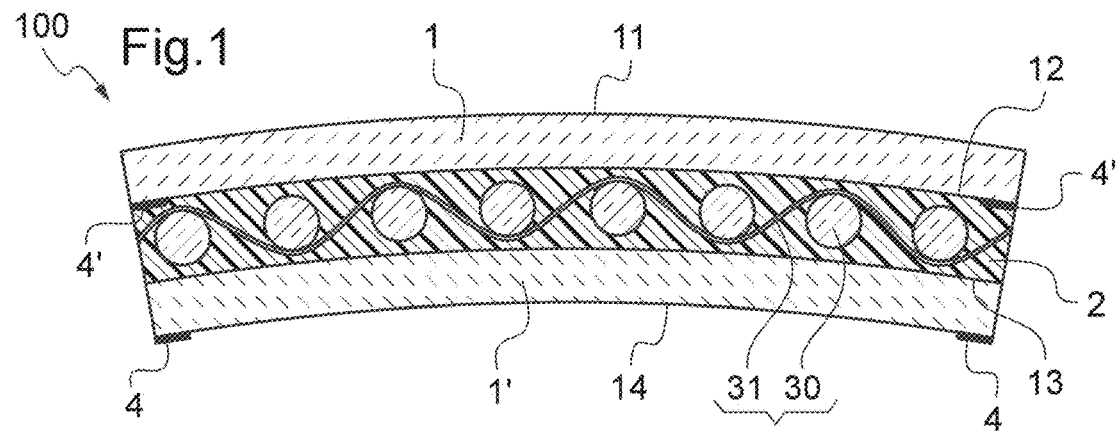

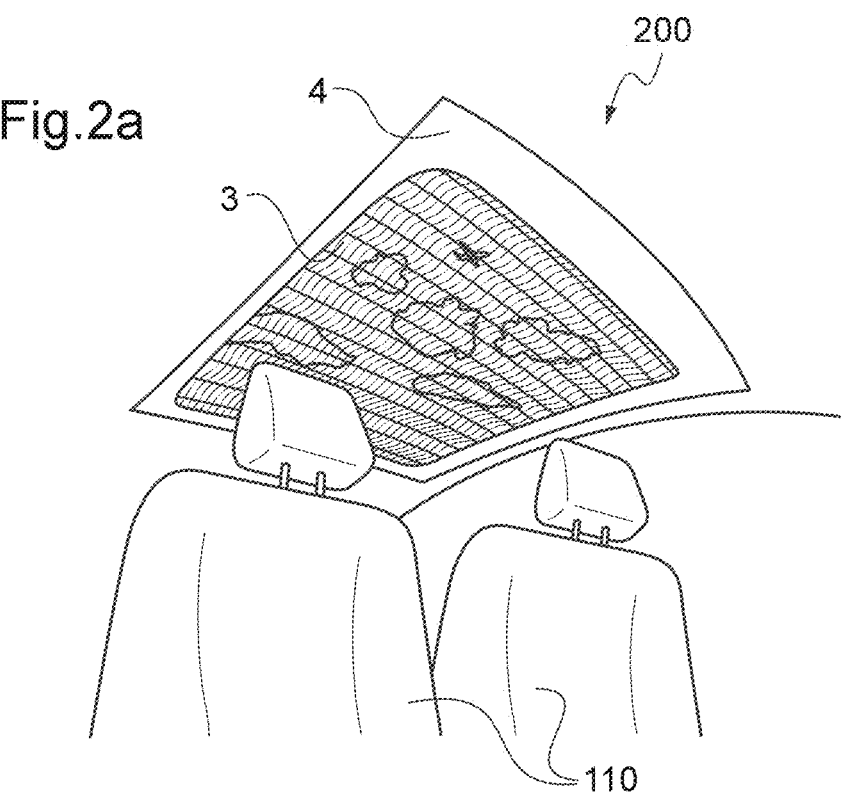
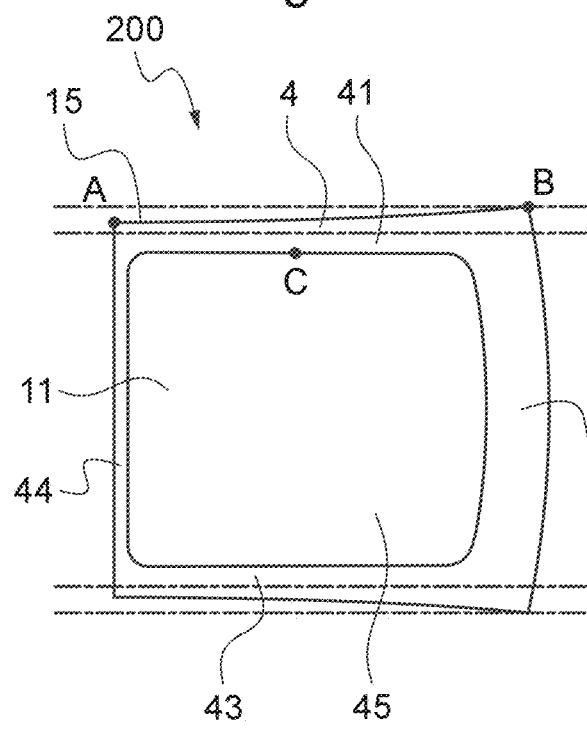
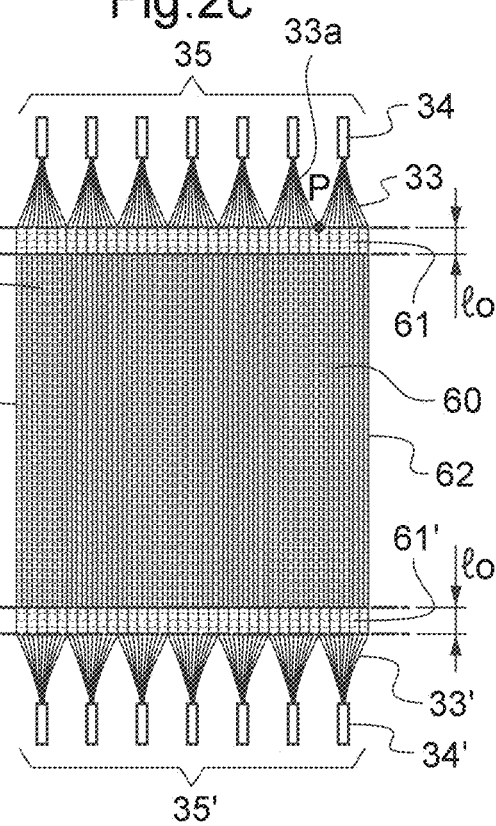

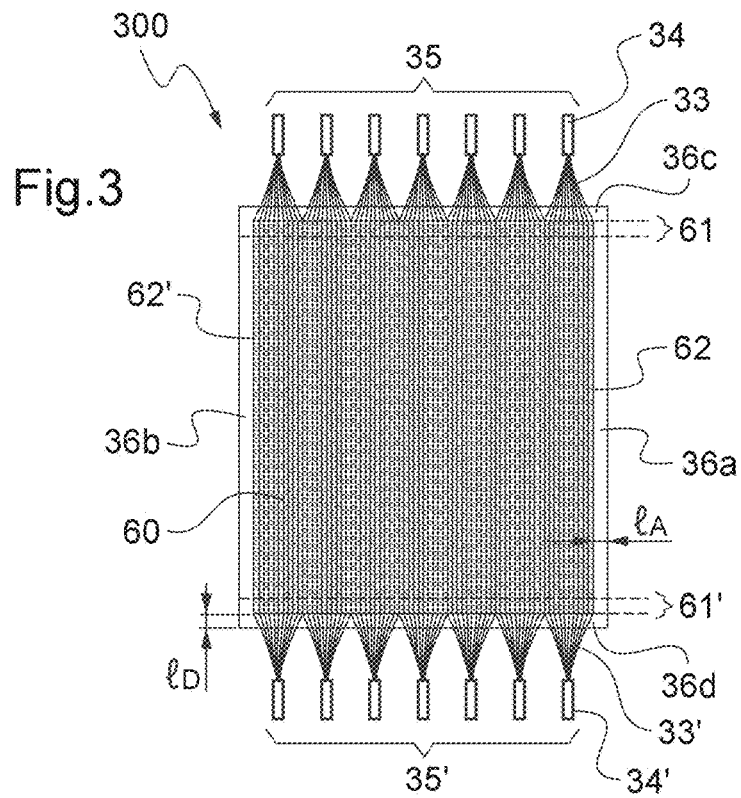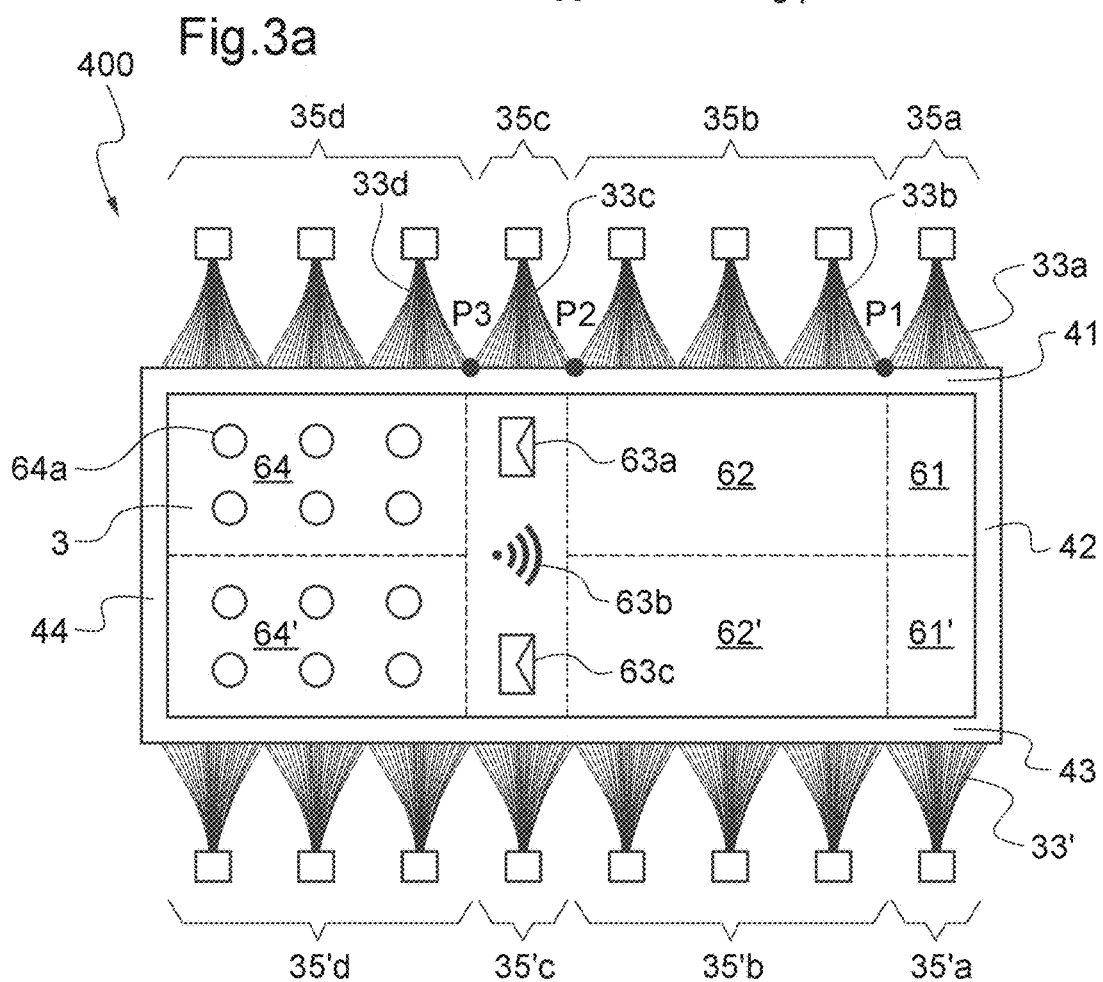

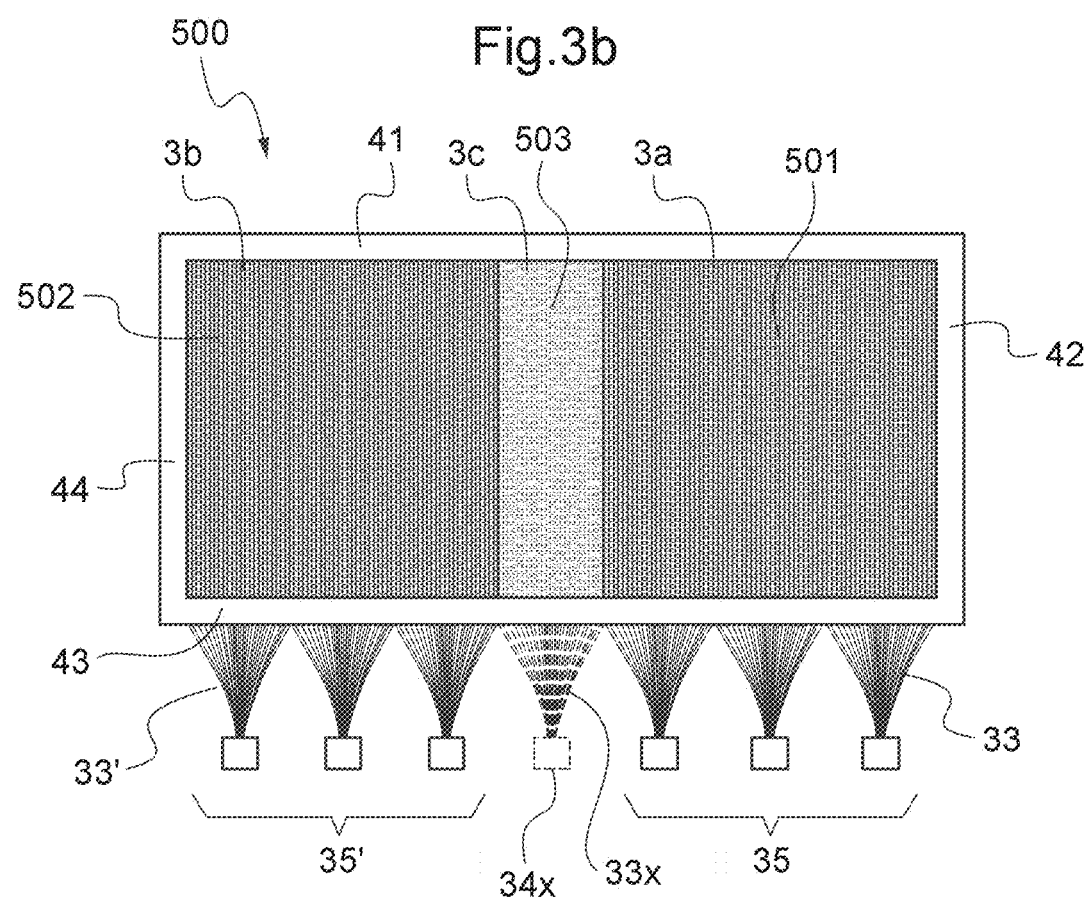

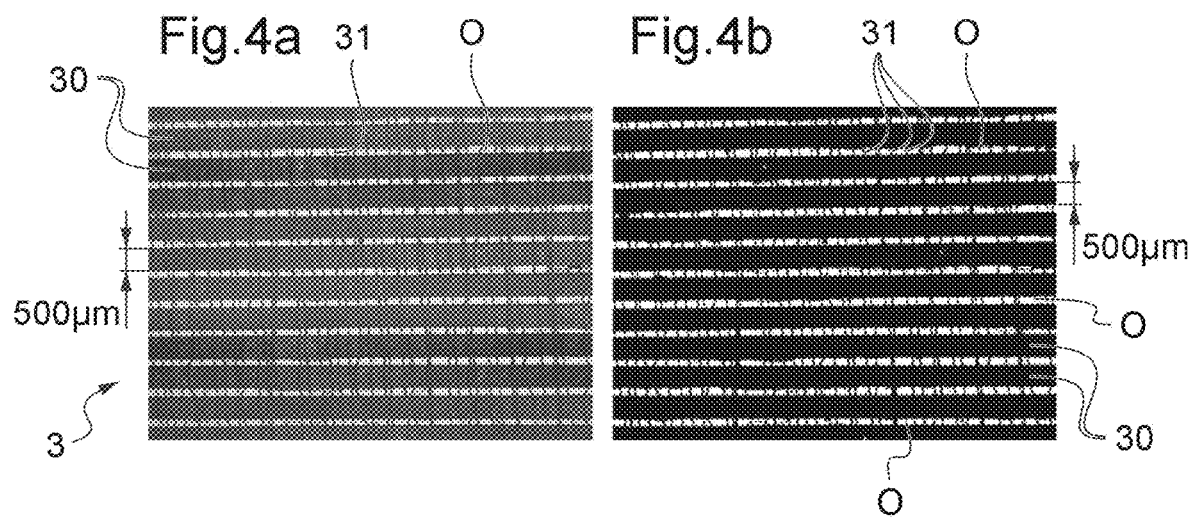
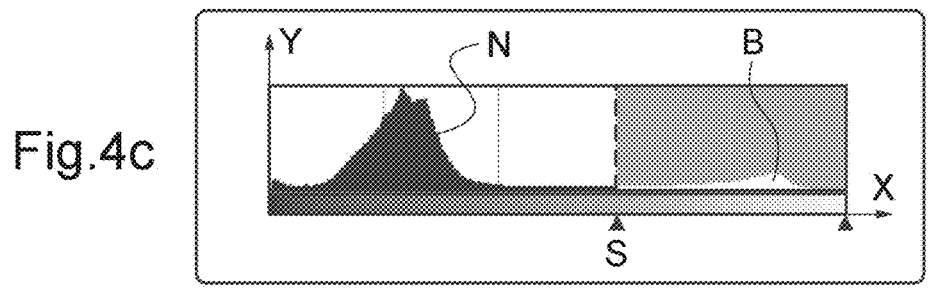

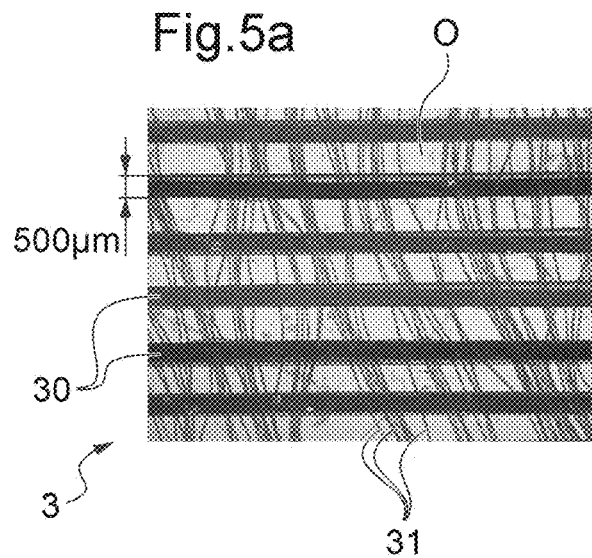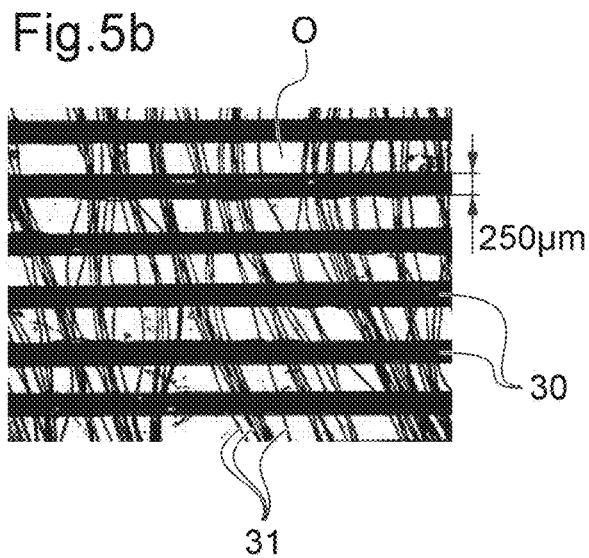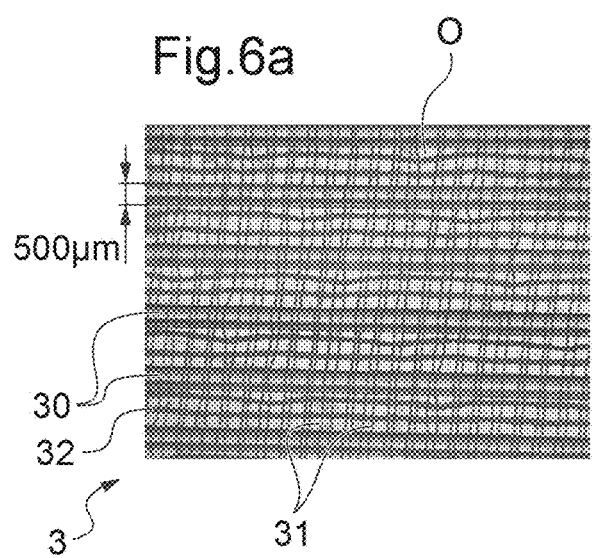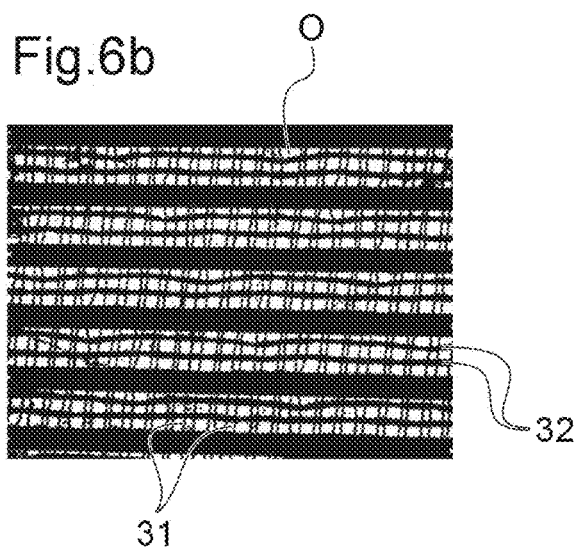

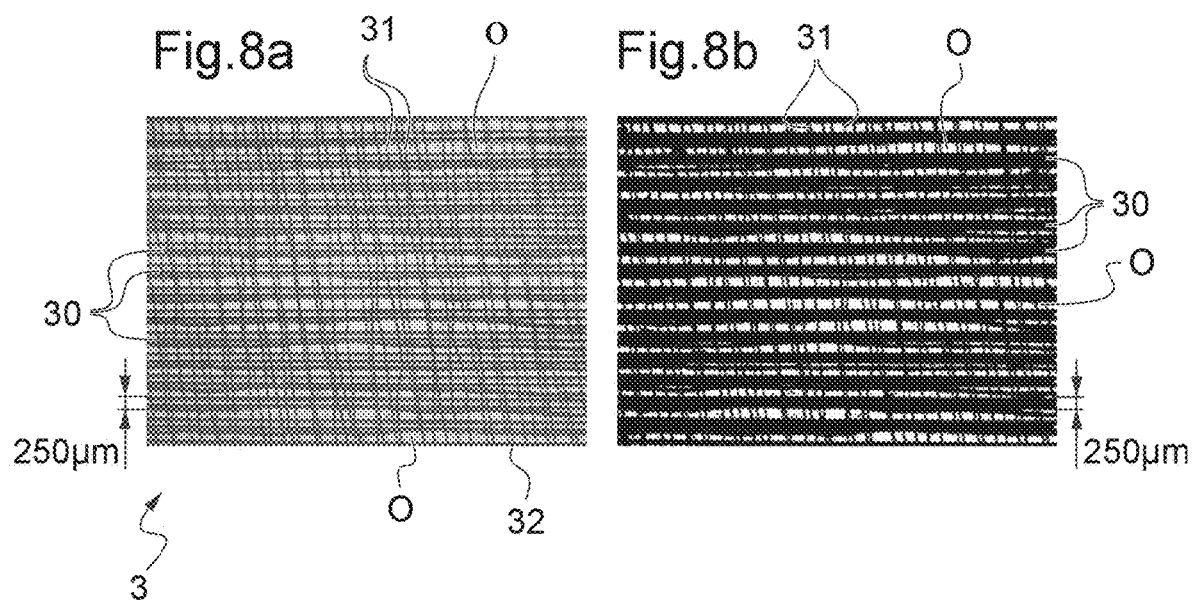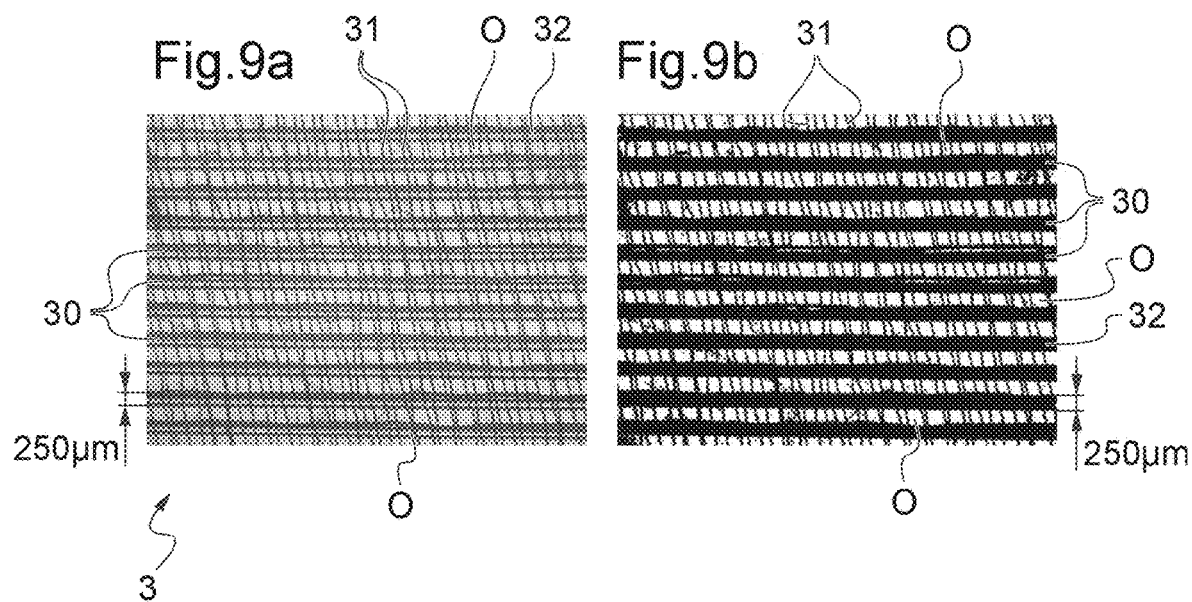

VEHICLE LUMINOUS GLAZING UNIT AND THE MANUFACTURE THEREOF

CROSS-REFERENCE TO RELATED APPLICATIONS

This application is the U.S. National Stage of PCT/FR2016/052271, filed on Sep. 9, 2016, which in turn claims priority to French patent application number 1558499 filed Sep. 11, 2015. The content of these applications are incorporated herein by reference in their entireties.

The invention relates to a vehicle glazing unit and more particularly a vehicle luminous glazing unit and the manufacture thereof.

There are more and more glazed roofs, some capable of providing ambient light. The light comes directly from light-emitting diodes inserted within the laminated glazing unit or else the diodes are optically coupled to the edge face of the interior glass of the laminated glazing unit and the light is extracted after guiding in the interior glass on the innermost face of the interior glass.

Document FR 2 899 852 itself proposes a luminous glazed roof having light-emitting diodes on the edge face with means for extracting the light from the glazing unit that also act as means for occluding solar radiation in order to avoid the use of a conventional sun blind.

The objective of the invention is an alternative motor vehicle glazed roof—and more broadly any vehicle glazing unit—that combines a luminous function and an occluding function.

For this purpose, one subject of the present invention is a vehicle, preferably road vehicle, luminous glazing unit and in particular a roof, having a laminated glazing unit comprising:
  a first, preferably curved (bent), glazing pane, made of mineral glass (which is preferably tinted, in particular gray or green), with a main face referred to as F1 intended to be on the exterior side of the vehicle and an opposite main face referred to as F2, having a thickness E1 preferably of at most 2.5 mm, even of at most 2 mm—in particular 1.9 mm, 1.8 mm, 1.6 mm and 1.4 mm—or even of at most 1.3 mm or of at most 1 mm,
  a lamination interlayer made of polymeric material, preferably thermoplastic polymer material, (which is clear, extra-clear and/or tinted, in particular gray or green) on the face F2 side, having a (total) thickness E0 of at most 2.2 mm, better still of at most 2 mm, of at most 1.5 mm or even of at most 1 mm, for example from sheets of 0.38 mm or 0.76 mm (2 or 3 sheets or more), and optionally an acoustic, in particular central, sheet,
  a second glazing pane, preferably curved (like the first glazing pane), made of glass, preferably mineral glass, or even organic glass, with a main face referred to as F3 on the lamination interlayer side and an opposite main face referred to as F4, in particular intended to be on the interior side of the vehicle, having a thickness E'1 preferably even of at most 2 mm—in particular 1.9 mm, 1.8 mm, 1.6 mm and 1.4 mm—or even of at most 1.3 mm or of at most 1 mm, the total thickness of the glazing panes preferably being strictly less than 4 mm, even less than 3.7 mm,
  a light source (preferably one or more point sources, such as diodes, preferably light-emitting diodes (LEDs)) at the periphery of the laminated glazing unit,
  means for occluding the solar radiation.

The laminated glazing unit according to the invention comprises, between the face F2 and the face F3, a luminous woven textile comprising (and even better constituted of) warp yarns, weft yarns and optical fibers as weft (preferably) and/or as warp, the luminous woven textile in particular having a thickness E1 of less than E0, preferably of at most 1 mm, even of at most 0.5 mm.

The woven textile comprises a first and/or a second luminous surface toward the first and/or the second glazing pane, all or some of the optical fibers being capable, via alterations at least in a portion located on a(n exterior) side of the woven textile, of emitting light sideways (therefore substantially perpendicular to the longitudinal axis of the optical fiber) toward the first (therefore the face F2) and/or the second glazing pane (therefore the face F3), all or some of the optical fibers protruding (preferably as bundle(s)) from a first edge face of the laminated glazing unit (and even from a second edge face of the laminated glazing unit on the opposite side to the first edge face).

The first light source is connected to the first free ends of the optical fibers (preferably grouped together in bundle(s))—in particular the woven textile covering a surface referred to as a textile surface (at least partly in the clear glass area and even covering the entire clear glass area)—or even a second light source is connected to the second free ends of the optical fibers (double injection of light).

The woven textile has openings between the warp yarns, the weft yarns and the optical fibers, and the laminated glazing unit lets a fraction of the solar radiation through (mostly) via said openings and has a clarity C (in the non-luminous state, therefore in the off state) of at least 75% and preferably of at least 85% and more preferentially still of at least 90%.

The luminous woven textile is part of the occluding means—in the sense that it blocks (by reflection and/or absorption) a fraction of the solar radiation.

The luminous woven textile is in optical contact with the faces F2 and F3 (therefore no air-filled space) and is even preferably embedded in a polymeric material, in particular embedded in the polymeric lamination material.

Unlike the luminous roof of the aforementioned prior art, the vehicle luminous glazing unit according to the invention, owing to the luminous woven textile, allows a luminous design that preserves a view of the outside—the entire clear glass area may be illuminated for example. The luminous woven textile also makes it possible to illuminate, at the same time, close or even contiguous zones with different colors without mixing of the colors.

Furthermore, the use of a conventional occulting blind with its actuating means remains superfluous, which lightens the weight of the vehicle and saves space and even increases the clear glass area.

In addition, by inserting the luminous woven textile according to the invention into the laminated glazing unit, it is protected from external attacks such as abrasion, liquids, etc.

A conventional (non-luminous) woven textile is a sheet consisting of yarns based on directionally distributed fibers that is obtained by weaving or knitting. Weaving is the result of interlacing, in a same plane, yarns positioned in the direction of the warp (referred to hereinbelow as warp yarns) and yarns positioned perpendicular to the warp yarns, in the direction of the weft (referred to hereinbelow as weft yarns). The binding obtained between these warp yarns and these weft yarns is referred to as a weave.

A luminous woven textile is obtained by weaving yarns and optical fibers. Such luminous woven textiles are for example described in applications WO 2005/026423, WO 2008/035010 and WO 2008/087339. Luminous woven textiles that use in particular glass yarns are described in application WO 2014/202868. A laminated glazing unit with a luminous textile that is as transparent as possible is described in application WO 2008/062141.

The yarns make it possible to ensure the good cohesion of the whole of the luminous woven textile and to impart, depending on their nature, their size and/or their mechanical properties, particular properties to the luminous woven textile.

According to the invention, the term "weft yarn" or "warp yarn" comprises all yarns or fibers other than optical fibers, that is to say all yarns or fibers that do not have the property of being able to emit light sideways and therefore that are not directly connected or connectable to a light source.

The preferred configuration comprising the optical fibers used as weft yarns makes it possible to allow a certain length of optical fibers to protrude beyond the sides, that is to say at the edge of the luminous woven textile, therefore at least the first edge face (and even the opposite edge face referred to as the second edge face). This enables the subsequent connection to the first light source. In one configuration, when the optical fibers are weft optical fibers—and with alterations on a given exterior side—, some warp yarns, that may be referred to as ground yarns, do not interlace the optical fibers (and even are on the side opposite to that of the alterations), for greater light extraction.

More broadly, the optical fibers and the yarns may be used as warp yarns and/or as weft yarns. The configuration comprising the optical fibers used as warp yarns itself enables links to be obtained that are much greater than that which the width of the weaving loom allows with the optical fiber as weft yarns.

Preferably, the openings form quadrilaterals that are (mostly and even at least 80%, 90%) convex (in particular rectangular, square), sometimes crossed (as hourglass).

Preferably 50% to 80% of the openings have a surface area of less than 5×5 mm$^2$ better still less than 1 mm×1 mm (above the diffraction limit) and greater than 20 µm×20 µm, better still greater than 40 µm×40 µm and even greater than 100 µm×100 µm, even better still greater than 200×200 µm.

The clarity (expressing the degree of small-angle scattering) is the most relevant parameter for evaluating the readability through the luminous glazing unit, such as very fine details to be seen through the luminous glazing unit. Another known term is image clarity. The clarity is determined at an angle of less than 2.5°.

Preferably, the laminated glazing unit with the luminous woven textile has a haze (in the non-luminous/off state) which is at most 45% and even at most 40%, haze expressing the degree of small-angle scattering.

The ASTM D1003 standard defines the haze as being the amount of light that deviates on average by more than 2.5° relative to the incident light beam—expressed as a percentage.

The image clarity and haze are preferably measured by a hazemeter (such as BYK-Gardner Haze-Gard Plus) preferably according to the ASTM D1003 standard (without compensation) or else the ISO 13468 standard (with compensation).

Measurements of clarity and of light transmission may be carried out on luminous woven textiles alone before lamination in order to preselect the luminous woven textile ad hoc.

Naturally, it is preferred to choose a lamination interlayer (in particular that is clear) which has the lowest possible haze, that is to say a haze of at most 2% or else of at most 1.5% and even of at most 1%.

Preferably, the most luminous face of the luminous woven textile—usually the portion with the alterations—is placed on the side of the glazing pane to be illuminated ("light output glazing pane" which is the second or first glazing pane) therefore:

toward the second glazing pane in order to illuminate the inside of the passenger compartment of the vehicle (roof, side window, windshield, rear window, etc.), towards the first glazing pane for the outside of the passenger compartment of the vehicle (rear window, side window, windshield, etc.).

Preferably, in the clear glass area, the insertion of any element (in particular having a certain area) that masks too many openings (for example at least 50% of the openings) of the luminous woven textile is avoided: coating (film, deposit, etc.) that is opaque, absorbent in the visible spectrum, reflective in the visible spectrum, or scattering.

For a good illumination, the polymeric material (preferably the lamination polymeric material), at least between the alterations and the face of the light output glazing pane (the second or the first glazing pane), is clear, even extra-clear and/or said light output glazing pane (the second or the first glazing pane) is clear, even extra-clear.

The optical contact of the luminous woven textile with the glazing panes is essential for the visual finish and in order not to weaken the glazing unit. Thus, the luminous woven textile is preferably laminated to the first and second glazing panes by the lamination interlayer in order to easily ensure the optical contact. The lamination polymeric material then also fills the openings of the luminous woven textile.

This laminating solution is preferable to an alternative gluing solution in which, at the time of manufacture, the lamination interlayer is a sheet that has a recess in which the luminous woven textile is placed and an additional adhesive material separate from that of the sheet is used on the front and rear faces of the woven textile (for example glue, a double-sided adhesive tape, on F2 and/or on F3).

The openings of the luminous woven textile could be filled by material before lamination (by dip coating, etc.) and in particular by the lamination polymeric material.

The luminous woven textile may preferably be embedded in the lamination plastic material before being applied to the glazing panes (before lamination).

The laminated glazing unit may comprise other, preferably discrete, functional elements in particular over suitable limited areas in particular between faces F2 and F3:

sensor(s), additional light source(s) such as one or more (light-emitting) diodes, lens.

The laminated glazing unit may also comprise other functional (antenna, heating, etc.) layers.

Preferably, after lamination, the woven textile is embedded (encapsulated) in the lamination polymeric material for example using sheets of the same polymeric nature (optionally of different grade or tint and/or of different thicknesses). One of the sheets (in particular the central sheet) may have an acoustic function and has for example a thickness of between 0.5 mm and 1 mm.

The surface area of the lamination interlayer may be smaller than the surface area of the laminated glazing unit, for example leaving a free and therefore not laminated (frame-shaped) groove, in particular of 1 or several mm, under a peripheral (enamel, etc.) masking zone.

In the present application, a vehicle is understood to mean:
- a road vehicle: for private or public transport, for people or merchandise
- a rail vehicle: train, metro, tramway
- a maritime vehicle: boat
- or even an aerial vehicle.

Included as road vehicle are a car, in particular a commercial vehicle (pickup truck, minivan, van) of less than 3.5 tonnes (light commercial vehicle) or else a truck, or bus. The favored application is a road vehicle (car) in particular a fixed or opening (panoramic) roof, a side window, in particular a rear side window, a rear window or even a windshield, in particular that is panoramic. The (fixed or opening) side glazing panes may be sliding doors. The luminous glazing unit forming a rear window may be in a rear door.

In one advantageous embodiment, the luminous woven textile has an opening factor $T_O$ of at least 5%, better still of at least 10% and preferably of at most 50%, and even of at most 40% in order to favor occlusion and/or illumination.

The increase in the density of optical fibers in order to increase the illumination is possible if the optical fibers do not become contiguous and if the (nonzero) density of (fine) warp yarns is lowered as much as possible without excessively penalizing the mechanical strength.

The opening factor $T_O$ is defined as the total surface area occupied by the openings over the zone of luminous woven textile intended to be in the clear glass area. The opening factor $T_O$ is for example evaluated over a surface area which is a rectangle of centimeter-size length L (for example from 2 to 10 cm) and of width I>0.8 L. This surface area preferably comprises at least 100 openings, in particular at least 10 openings along the longitudinal axis of the fibers and at least 10 openings along the perpendicular to this axis. $T_O$ may be an average value.

The opening factor may be evaluated directly by numerical analysis from a grayscale image using an optical microscope or after processing of the image preferably in grayscale. A histogram of the image, i.e. a distribution of the intensities of the image, is produced. The histogram may reveal two separate humps separated by points (pixels) of low intensity. A threshold is set between these two humps corresponding to the minimum of pixels in this zone. Above the threshold, the pixels are white and correspond to openings (below the threshold the pixels are black and correspond to zones of yarns or fibers). Obtained from this histogram and the thresholding is a black-and-white processed image representative of the luminous woven textile. If necessary for greater precision (accuracy), it is possible to darken one or some yarn or fiber zones that appear abnormally white. From this processed image, the opening factor $T_0$ is calculated by numerical analysis: counting of the white and black pixels. $T_0$ is the number of white pixels over the sum of the white and black pixels.

The opening factor may preferably be constant or vary from one zone to another of the luminous woven textile.

In one advantageous embodiment, since the luminous woven textile has a non-zero light transmission $T_L$ (in the clear glass area), the ratio $T_O/T_L$ is less than 1 and even at most 0.75 in order to favor occlusion and/or illumination and preferably the ratio $T_O/T_L$ is at least 0.1, even at least 0.2.

The fact that a fraction of the light passes through the optical fibers (excluding the openings) and even, in certain configurations, the yarns is put to good use.

The luminous woven textile may be a single part or an assembly of several separate or contiguous parts.

In other words, the vehicle luminous glazing unit may comprise a plurality of luminous woven textile zones of identical or different size and/or shape that also produce luminous surfaces of identical or different size and/or shape and/or color.

The luminous woven textile (one or more parts) may cover a portion or the whole of the clear glass area or even of the laminated glazing unit depending on the desired effect (in the form of strips—or even a frame—positioned at the periphery of one of the faces, as one or more logos or patterns, etc.).

The identical or different, continuous or discontinuous luminous patterns may be of any geometric shape (rectangular, square, triangular, circular, oval-shaped, etc.), and may form a drawing or signage. Said signage is based on iconic and/or linguistic semantics, i.e. using signs (numbers, pictograms, logos, symbolic colors, etc.) and/or a letter or words.

The first (and/or second) light source, the alterations and the density of optical fibers may be adjusted to give ambient lighting, light for reading, luminous signaling, night lighting or illumination for displaying information of any nature, of drawing, logo, alphanumerical signaling or other signage type, and may also be activated by remote control (detection of the vehicle in a parking lot or elsewhere, indicator of (un)locking of doors), safety signaling, etc. The light may be continuous and/or intermittent, monochromatic and/or polychromatic, white, etc.

It is possible to provide a variation of the number of openings from one luminous zone to another (in particular along the warp yarns) and even to add an opaque or virtually opaque zone (with no opening or with $T_O$ of at most 1%) that is adjacent (contiguous or non-contiguous) via an opaque luminous woven textile spaced apart from the woven textile according to the invention or forming a peripheral zone (an extension) of the luminous woven textile according to the invention.

The luminous woven textile according to the invention extends into the clear glass area of the luminous glazing unit (non-opaque, non-masked zone). Preferably at least 50%, better still at least 60%, or even at least 80% or at least 90% of the luminous woven textile extends into the clear glass area and even via the distribution of the alterations at least 50%, even at least 80% or even at least 100% of the luminous woven textile in the clear glass area forms one or more luminous zones (illuminated together or separately, of different or identical colors). Preferably the luminous woven textile extends over at least 50%, better still at least 60%, or even at least 80% or at least 90% of the clear glass area and even via the distribution of the alterations of the textile, one or more luminous zones (illuminated together or separately, of different or identical colors) of the luminous woven fabric extends over at least 50%, even at least 80% or even at least 100% in the clear glass area. Preferably, the luminous woven textile has a size perpendicular to the optical fibers of at least 5 cm. The (substantially) rectilinear optical fibers are preferably weft fibers and are even substantially perpendicular to the first (straight or curved) edge face. When the glazing unit is longer than it is wide (rectangular, predominantly rectangular, etc.) it is preferred that the first edge face be the longitudinal edge face.

The luminous woven textile according to the invention advantageously has:
- a luminance of at least 1 cd/m² (decorative zone)
- a luminance of at least 10 cd/m² (ambient light)
- and for a reading light (at 600 mm from the source) with an illumination means of greater than 65 lux in a diameter of 280 mm and illumination means of greater than 55 lux in a diameter of 500 mm.

The optical fibers extend outside of the surface defined by the luminous woven textile corresponding to the edge of the luminous woven textile, preferably as (adjacent) bundle(s). The optical fibers may be braided or grouped together in the form of bundles so as to make a plurality of free ends cooperate opposite one and the same light source. Regarding the manufacture of the luminous woven textile and the connection of the optical fibers, reference may be made to document FR 2 859 737.

The optical fibers are capable, once connected to the first light source, of emitting light sideways owing to the presence of said invasive alterations along their surface, which alterations are present in all or some of the length of the optical fibers in the clear glass area, in the laminated glazing unit. One or some optical fibers of the luminous woven textile may be inactive by not being supplied with power or even having no invasive alterations, therefore forming one or more dark lines and even more or less extensive dark zones (as required). The inactive optical fibers may be in a group, next to one another, or alternate with the "active" optical fibers. It is not essential to include the inactive optical fibers in the bundles and/or even to make them protrude from the laminated glazing. For example, the inactive optical fibers are cut in the (output) areas around the first edge face.

The optical fibers therefore comprise invasive alterations, corresponding to notches or small slits, which enable the extraction of light at the fibers since they modify the angle of reflection of the light rays inside the fiber and the lateral transmission of light outside of the fiber. The optical fibers therefore make it possible both to convey the light inside their structure but also to emit light sideways. Consequently, the optical fibers make it possible to guide the light, in a distributed manner, inside the luminous woven textile and to diffusely illuminate the main surfaces of the luminous woven textile.

The invasive alterations may be obtained in various ways and in particular by abrasive processes such as sandblasting, chemical attack or melting by means of a high-intensity light ray such as a laser.

The invasive alterations may be made on the optical fibers before or preferably after weaving. Preferably the invasive alterations are obtained by sandblasting.

For an optical fiber (or a given group of optical fibers) the length of the portion bearing the alterations is chosen as a function of the desired effect, just like the number of portions bearing alterations along this optical fiber. An optical fiber may have alterations on a first exterior side and a second optical fiber on the other exterior side (second optical fiber resulting from the same bundle preferably for a double-sided fabric or from a different bundle for example in order to form two adjacent luminous zones, one toward the first glazing pane and the other toward the second glazing pane). For simplicity, for the optical fibers of a given bundle, alterations on the same exterior side are chosen, or even for the optical fibers of the bundles located on the first edge face side, alterations on the same exterior side are chosen, or even better still for the optical fibers of all the bundles on the first edge face and second edge face side, alterations on the same exterior side are chosen.

It is possible to vary:
- the location of these invasive alterations so as to define a particular pattern for example to produce a signaling, or to display a message or an image,
- the surface density or the size of the invasive alterations created from one zone to the next of the woven textile, for example, in order to produce uniform lighting of the luminous woven textile with a single injection, by decreasing the surface density at the zones in the vicinity of the first light source or in order to deliberately obtain lighting gradients.

For a single injection, if a uniform light is desired, the profile of the alterations is adjusted: intensity of sandblasting increasing on moving away from the first light source. With a double injection, if two decoupled light zones capable of being illuminated at the same time without light pollution are desired, the profile of the alterations is adjusted so that the light from the first light source is extracted in the first zone (the zone closest to the first source, to the first edge face) and so that the light from the second light source is extracted in the second zone (the zone closest to the second source, to the second edge face). With a double injection, if a uniform surface is desired between the first and second edge faces, the profile of the alterations is adjusted so that the light from the first light source is extracted in the first zone (the zone closest to the first source, to the first edge face) forming the first half of the surface and so that the light from the second light source is extracted at the same time in the second zone (the zone closest to the second source, to the second edge face) forming the second half of the surface.

The one-component or two-component optical fibers advantageously have a (core or total) diameter of:
- greater than 100 μm, preferably greater than 200 μm and better still greater than 250 μm,
- less than 2000 μm, preferably less than 1000 μm and better still less than 750 μm,
- between 100 and 1000 μm, preferably from 200 to 550 μm.

When the fibers used are core-cladding fibers (preferred fibers), the thickness of the cladding is for example between 2 and 30 μm, preferably from 5 to 20 μm or even from 5 to 10 μm.

The density of the optical fibers as number of optical fibers per centimeter is preferably less than 30 and even less than 20 and preferably at least 5 and even at least 10.

The product of the diameter of the optical fibers in millimeters and of the density of the optical fibers as number of optical fibers per millimeter preferably ranges from 0.15 to 0.825.

Preferably the optical fibers have a diameter (in particular core or total diameter) of from 200 to 300 μm, for a density of 5 to 21 and even to 25 optical fibers/cm or the optical fibers have a diameter of from 450 to 550 μm for a density of at least 5 optical fibers/cm and of at most 15 optical fibers/cm.

The optical fibers therefore comprise free ends capable of being connected (therefore connectable) or arranged opposite a first (or even second) light source in order to transmit the light and emit the light sideways at the alterations.

The luminous glazing unit may have an optical collector comprising:
- a (circular, hexagonal, etc.) strand of optical fibers
- a jacket that is a metal ring (for example made of aluminum) which is crimped (preferably over at least a distance of 4 mm and of at most 8 mm) and then not crimped (preferably over at least a distance of 3 mm and of at most 6 mm) gathering and holding the ends of the optical fibers as a strand (of circular or hexagonal type).

A metal jacket (for example made of aluminum) that gathers the optical fibers over a (substantially) circular area having $R_{INT}$ around 2.5 mm and optical fibers (organic optical fibers for example) having a diameter of 500 μm will be preferred.

And preferably at least 70 fibres, or even 75 optical fibers per collector are chosen.

Preferably a strand comprises:
at most 200 optical fibers for optical fibers having a diameter of 500 μm approximately (typically between 470 and 530 μm), or even at most 100 optical fibers for optical fibers having a diameter of 500 μm approximately (typically between 470 and 530 μm),
and at most 600 optical fibers for optical fibers having a diameter of between 200 μm and 300 μm.

The optical fibers, in particular chosen to be identical, may have a circular, or even substantially circular, or even hexagonal, or even partially circular and partially hexagonal cross section in particular in a crimping zone of the jacket.

The collector may comprise optical fibers (in the preferably crimped jacket) having an average power per fiber preferably of between 0.35% and 0.46% of the flux emitted by the (LED) source for fibers having a diameter of 500 μm approximately (typically between 470 and 530 μm), or having an average power per fiber of between 0.075% and 1.35% of the flux emitted by the (LED) source for a diameter between 250 μm and 750 μm.

More broadly, the luminous glazing unit may comprise an optomechanical system for injecting light, a lens, a peripheral reflective surface surrounding the lens, the optical collector, preferably having rotational symmetry, which comprises a (circular, hexagonal, etc.) strand of optical fibers, a member for aligning the optical collector with the optical coupler, the optical coupler and the aligning member being integrally formed or being indirectly or directly fastened together.

The optical lens may be inserted between the light source and the ends of the optical fibers in order to concentrate the light at said ends and to limit the light transmission losses. Regarding the optomechanical system, reference may be made to patent FR 1 357 461.

The optical fibers may be formed from a mineral or organic material and may be one-component or two-component optical fibers. The mineral materials are for example selected from the group comprising glass, quartz and silica. The organic materials are for example selected from the group comprising polymethyl methacrylate (PMMA), polycarbonate (PC), cyclic olefins polymers (COP) and fluoropolymers.

A cladding may cover the optical fibers in order to protect them. In this case, the optical fibers are made of two materials and have a core covered by a cladding which may be of a different nature. These structures are also referred to as core-shell structures.

As two-component optical fibers that are very particularly suitable, mention may be made of the fibers comprising a polymethyl methacrylate (PMMA) core and a cladding based on a fluoropolymer such as polytetrafluoroethylene (PTFE).

Among the mineral optical fibers, mention may be made of the one-component optical fibers based on silica or two-component optical fibers comprising a silica core and a polymer cladding. The use of optical fibers of this type of partially or completely mineral nature makes it possible to increase even more the proportion of mineral materials in the woven textile and facilitates the lamination.

The distribution between weft yarns and weft optical fibers is for example 1/1, 1/3 or 2/1.

The woven textile may be organic and/or mineral (in particular glass or silica yarns or fibers).

The yarns may comprise a combination of yarns of different nature such as yarns based on organic, metallic or mineral fibers, and others based on glass fibers.

The yarns may be made of specifically treated polymers such as TREVIRA® polyester yarns. The yarns may also be made of polyamide or made of (metalloplastic) lurex®.

The yarns are defined by their tex or dtex count or linear mass density. The tex corresponds to the mass in grams of 1000 m of yarn. The dtex (decitex) corresponds to the mass in grams of 10 000 m of yarn.

The weft yarns of synthetic nature (polyamide, polyester, lurex, etc.) preferably have a count in a range from 50 to 200 dtex. The warp yarns of synthetic nature (polyamide, polyester, lurex, etc.) preferably have a count of at most 80 dtex and even of at most 30 dtex.

Preferably the weft yarns are opaque (white, etc.), less dense than the warp yarns that are preferably transparent and even fine. In particular:
the (in particular polymeric) warp yarns, in particular which are transparent, have a yarn density of between 30 and 60 cm$^{-1}$ and/or a count of 10 to 70 dtex and even of 20 to 30 dtex,
and/or the (in particular polymeric) weft yarns, in particular which are reflective, tinted or opaque (white, black, etc.), have a yarn density of at most 25 cm$^{-1}$ (in particular of at most 18 or 15 cm$^{-1}$ if the optical fibers have a diameter of 450 to 550 μm; or of at most 21 or 20.5 cm$^{-1}$ if the optical fibers have a diameter of 200 to 300 μm) and/or a count of at most 300 dtex or of at most 200 dtex.

The glass yarns used as weft yarns have, in order of increasing preference, a count of greater than 34 tex, between 50 and 800 tex, between 100 and 250 tex, between 120 and 220 tex. The glass yarns used as warp yarns have, in order of increasing preference, a count of greater than 34 tex, between 50 and 800 tex, between 60 and 250 tex, between 60 and 140 tex, between 60 and 80 tex.

All or some of the weft and/or warp yarns may be reflective, in particular metalloplastic, or tinted, in particular opaque, preferably white or black.

Conventionally the weft or warp yarns are white and the optical fibers are transparent.

The woven textile is therefore often of white color.

The luminous woven textile may advantageously comprise sets of colors that may be obtained by means of the light sources used to illuminate the optical fibers (for the on/luminous state) but also by coloring the various weft or warp yarns.

Coloring is understood to mean the fact of using yarns that are bulk tinted or coated with a colored layer before being woven, or else the fact of printing the woven textile with a colored pattern, after weaving, via processes such as screen-printing or inkjet printing.

The woven textile may therefore be of white color (via the yarns) or tinted another color (black included) by means of the use of yarns that are tinted or coated before weaving.

The luminous woven textile may comprise at least one decorative (logo, etc.) or signage luminous pattern, in particular a pictogram located on at least one portion of the surface of the luminous woven textile capable of emitting light. The decorative pattern may be obtained by carrying out the step of creating invasive alterations on said portion of the surface of the woven textile provided for the decorative pattern. The pattern is for example produced using a mask or a stencil before the treatment that enables the extraction of the light. In this embodiment, the product formed may make it possible to obtain personalized woven textiles.

The woven textile may comprise a "textile" decorative pattern or a decorative weave, in particular a jacquard pattern. According to the invention, the expression "jacquard pattern" is understood to mean a pattern obtained by producing a woven textile that combines several types of weave in the same woven textile. By using colored yarns, the jacquard weave allows very complex patterns and even the reproduction of an image (logo, etc.). A jacquard pattern therefore corresponds to a pattern created by a change of weave or of color in a region of the woven textile. The decorative pattern may define a logo or signage, resulting directly from the weaving of regions having differences in surface density of optical fibers. The jacquard pattern may be, as desired, treated in positive mode (luminous pattern on switched-off background) or negative mode (non-luminous pattern on luminous background).

The woven textiles of the invention may comprise a wave selected in particular from plain, twill, satin or jacquard woven textile weaves.

Depending on the type(s) of weave selected, it is possible to favor the presence of the optical fibers on one of the faces of the woven textile while ensuring a good strength of the woven textile. The weave is selected in order to maximize the proportion of optical fibers emerging on the face used as the main luminous surface of the luminous woven textile.

According to one advantageous embodiment of the invention, the woven textile comprises at least one portion woven with a twill weave and even a satin weave. The satin weave is selected from 4-harness satin, 6-harness satin, 8-harness satin, 10-harness satin and 12-harness satin weaves.

Regarding the first and second glazing planes, they are preferably both made of mineral glass. As examples of glass materials, mention may be made of float glass of conventional soda-lime composition, optionally thermally or chemically hardened or tempered, an aluminum or sodium borosilicate or any other composition. The float process making it possible to obtain a perfectly flat and smooth sheet, or by drawing or rolling processes.

The first glazing pane, like the second glazing pane, is preferably bent or curved. It may be parallelepipedal, with sheets or main faces of rectangular, square or even any other shape (round, oval, polygonal). It may be of various sizes, and in particular of large size, for example having an area greater than 0.5 or 1 m$^2$.

The decorative or signage pattern (letter, drawing, pictogram, etc.) is for example 5 cm high (perpendicular to the first edge face, the axis of the fibers) with:
- one or more luminous geometric sub-patterns of at least 0.5 mm (and at most 2 mm and even 1 cm) in a dark zone and/or in a dark background,
- one or more dark (geometric, extensive or isolated, etc.) sub-patterns of at least 0.5 mm (and at most 2 mm and even 1 cm) in a luminous background.

The first and/or second glazing pane may (depending on the esthetic finish or desired optical effect) be a clear glass (having a light transmission $T_L$ greater than or equal to 90% for a thickness of 4 mm), for example a glass of standard soda-lime composition such as Planilux® from Saint-Gobain Glass, or an extra-clear glass ($T_L$ greater than or equal to 91.5% for a thickness of 4 mm), for example a soda-lime-silica glass with less than 0.05% of Fe III or $Fe_2O_3$ such as the Diamant® glass from Saint-Gobain Glass, or Optiwhite® glass from Pilkington, or B270® glass from Schott, or glass of another composition described in document WO 04/025334.

The glass of the first and/or second glazing pane may be neutral (with no coloration), or (slightly) tinted, in particular gray or green, such as the VENUS or TSA glass from Saint-Gobain Glass. The glass of the first and/or second glazing pane may have undergone a chemical or thermal treatment of hardening or annealing type or a tempering (for a better mechanical strength in particular) or may be semi-tempered.

The tinted first and/or second glazing pane advantageously has a light transmission ranging from 1.0% to 60.0% (in particular from 10.0% to 50.0% and in particular from 20.0% to 40.0%).

It is preferred for the tinted glazing pane to be on the side opposite the one desired for the (main) output of the light. For a motor vehicle roof, the first glazing pane, made of mineral glass, is preferably tinted. If it is desired for the glasses (first and second glazing panes) to have the same tint, in particular clear or extra-clear, for example to facilitate production in a semi-tempered process, the woven textile may help to recover a "lost" tint of the (untinted) exterior glass.

The light transmission $T_L$ may be measured according to the ISO 9050:2003 standard using the illuminant D65, and is the total transmission (in particular integrated over the visible range and weighted by the curve of sensitivity of the human eye), taking into account both direct transmission and possible diffuse transmission, the measurement being carried out for example using a spectrophotometer equipped with an integrating sphere, the measurement at a given thickness then being converted, if need be, to the reference thickness of 4 mm according to the ISO 9050:2003 standard.

A table A below gives examples of glass sold by the applicant. The SGS THERMOCONTROL® Absorbing/Venus glass improves the thermal comfort by absorbing the energy load in the bulk of the glass. These types of glass are divided into two categories: "Vision" (light transmission>70%) and "Privacy" (light transmission<70%).

TABLE A

| Type of glass | $T_L$ (%) | $T_E$ (%) | $R_E$ (%) |
| --- | --- | --- | --- |
| SGS THERMOCONTROL ® Venus Green 55 | 49 | 27 | 7 |
| Green-tinted high-performance// Clear glass | 28 | 16 | 3 |
| SGS THERMOCONTROL ® Venus Green 35 | 35 | 22 | 5 |
| SGS THERMOCONTROL ® Venus Gray 10 | 10 | 8 | 1 |
| SGS THERMOCONTROL ® Absorbing TSA3+ | 71 | 44 | 18 |
| Standard green glass | 78 | 53 | 25 |

The "Vision" glass is suitable for all types of glazing in the vehicle: green/blue/gray and ensures a reduced energy transmission ($T_E$). The most popular color for this purpose is green. It has been chosen due to its neutral appearance which does not affect the harmony of the colors of a vehicle.

The "Privacy" glass is glazing that is bulk-tinted for thermal comfort and privacy. It is glazing that is supertinted dark green or dark gray. In order to ensure privacy, this glazing has light transmission values that are below 70%, generally around 55% or less. Due to its dark tint, this type of glass also ensures a low UV transmission (UV rays may cause skin irritation).

In most countries, Venus/Privacy glass is suitable for the rear side windows (after the B-pillar), rear window and roof.

SGS THERMOCONTROL® Venus consists of dark gray or dark green supertinted glazing. It has all the thermal advantages of "Vision" (SGS THERMOCONTROL® Type) glass with improved solar protection:

lower energy transmission values (compared to all other glass solutions), its dark color also blocks UV radiation, which is responsible for skin irritation and discoloration of the passenger compartment, offers greater privacy for the vehicle's passengers (it is difficult to see through the glass from the outside).

In one embodiment, the first glazing pane is made of mineral glass and the second glazing pane is made of organic glass (such as PC, PMMA, cyclic olefin copolymer (COC) or else polyethylene terephthalate (PET) optionally protected by a coating (on face F4).

Preferably, the luminous glazing unit according to the invention meets the current motor vehicle specifications, in particular for the light transmission $T_L$ and/or the energy transmission $T_E$ and/or the energy reflection $R_E$ and/or else for the total transmission of solar energy TTS.

For a motor vehicle roof, one or more of the following criteria are preferred:

$T_E$ of at most 10% and even from 4% to 6%, $R_E$ (preferably face F1 side) of at most 10%, better still from 4% to 5%, and TTS<30% and even <26%, even from 20% to 23%.

$T_L$ may be low, for example of at most 10% and from 1% to 6%.

For a windshield, $T_L$ may preferably be at least 70% and even at least 75%. Therefore, it is preferred to place the fabric locally and at the periphery (top or bottom portion or even left or right portion), in particular in a zone without a minimum threshold required for $T_L$).

For a motor vehicle rear window, $T_L$ may for example be at most 70%.

In order to limit heating in the passenger compartment or to limit the use of conditioned air, at least one of the glazing panes (preferably the exterior glass) is tinted, and the laminated glazing unit may also comprise a layer that reflects or absorbs solar radiation, preferably on face F4 or on face F2 or F3, in particular an electrically conductive transparent oxide layer referred to as a TCO layer (on face F4 preferably) or even a stack of thin layers comprising at least one TCO layer (on face F4 for example), or a stack of thin layers comprising at least one silver layer (on F2 or F3) or any other functional metal layer, the or each silver layer being positioned between dielectric (for example metal oxide and/or nitride or silicon oxide and/or nitride) layers. It is possible to combine a (silver) layer or stack of (silver) thin layers on face F2 and/or F3 and a TCO layer on face F4.

The TCO (electrically conductive transparent oxide) layer is preferably a fluorine-doped tin oxide ($SnO_2$:F) layer or a mixed indium tin oxide (ITO) layer.

Other layers are possible, including thin layers based on mixed indium zinc oxides (referred to as "IZO"), based on gallium-doped or aluminum-doped zinc oxide, based on niobium-doped titanium oxide, based on cadmium or zinc stannate, or based on antimony-doped tin oxide. In the case of aluminum-doped zinc oxide, the degree of doping (that is to say the weight of aluminum oxide relative to the total weight) is preferably less than 3%. In the case of gallium, the degree of doping may be higher, typically within a range extending from 5% to 6%.

In the case of ITO, the atomic percentage of Sn is preferably within a range extending from 5% to 70%, in particular from 10% to 60%. For layers based on fluorine-doped tin oxide, the atomic percentage of fluorine is preferably at most 5%, generally from 1% to 2%.

ITO is particularly preferred, in particular relative to $SnO_2$:F. Having higher electrical conductivity, its thickness may be thinner in order to obtain a same level of emissivity. Easily deposited by a sputtering process, in particular a magnetron sputtering process, these layers are distinguished by a lower roughness, and therefore a lower fouling.

One of the advantages of fluorine-doped tin oxide is, on the other hand, its ease of deposition by chemical vapor deposition (CVD), which unlike the sputtering process, does not require a subsequent heat treatment, and can be implemented on the line for producing flat glass via the float process.

The term "emissivity" is understood to mean the normal emissivity at 283 K within the meaning of the EN12898 standard. The thickness of the low-emissivity (TCO, etc.) layer is adjusted, as a function of the nature of the layer, so as to obtain the desired emissivity, which depends on the desired thermal performance. The emissivity of the low-emissivity layer is for example less than or equal to 0.3, in particular less than or equal to 0.25 or even less than or equal to 0.2. For ITO layers, the thickness will generally be at least 40 nm, or even at least 50 nm and even at least 70 nm, and often at most 150 nm or at most 200 nm. For fluorine-doped tin oxide layers, the thickness will generally be at least 120 nm, or even at least 200 nm, and often at most 500 nm.

For example, the low-emissivity layer comprises the following sequence:

high index sublayer/low index sublayer/TCO layer/optional dielectric overlayer.

As preferred example of a low-emissivity layer (protected during tempering), it is possible to select: high index sublayer (<40 nm)/low index sublayer (<30 nm)/an ITO layer/ high index sublayer (5-15 nm)/barrier low index sublayer (<90 nm)/last layer (<10 nm).

Mention may be made, as low-emissivity layer, of those described in patent US 2015/0146286, on face F4, in particular in examples 1 to 3. In one preferred embodiment:

the first and/or the second glazing pane is tinted (preferably at least the first glazing pane in particular if it is for a roof), and/or one of the faces F1 or F2 or F3 or F4—preferably face F4—of the laminated glazing unit, in particular a glazed roof, is coated with a low-emissivity layer, in particular comprising an electrically conductive transparent oxide (TCO) layer, in particular a stack of thin layers with TCO layer or a stack of thin layers with silver layer(s), and/or the lamination interlayer is tinted over all or part of its thickness (in particular apart from on the side of the most luminous surface, often the one with the alterations), and/or a tinted additional (polymeric, such as polyethylene terephthalate PET, etc.) film, in particular of submillimetric thickness, for instance of at most 0.3 mm, is between faces F2 and F3 or (glued) on F4 or even on face F1.

In particular, face F4 of the laminated glazing unit, in particular a glazed roof, is coated with a transparent, in particular low-emissivity, functional layer preferably comprising a TCO layer, one (electrically powered, therefore electrode) zone of which forming a touch button (for controlling the first luminous surface).

The lamination interlayer may itself be made of polyvinyl butyral (PVB), polyurethane (PU), ethylene/vinyl acetate copolymer (EVA), formed from one or more films, for example having a thickness of between 0.2 mm and 1.1 mm.

The lamination interlayer, in particular based on polyvinyl butyral (PVB), may have a cross section that decreases in a wedge shape from the top to the bottom of the laminated glazing unit, in particular to avoid a double image in the case of a head-up display (HUD), in particular in a windshield (in particular of a road vehicle).

The (lamination) interlayer may comprise at least one central layer made of viscoelastic plastic material with vibro-acoustic damping properties, in particular based on polyvinyl butyral (PVB) and plasticizer, and the interlayer, and additionally comprising two outer layers made of standard PVB, the central layer being between the two outer layers. Optionally one or both outer layers has a cross section that decreases in a wedge shape from the top to the bottom of the laminated glazing unit, the layer made of viscoelastic plastic material with vibro-acoustic damping properties having a constant cross section from the top to the bottom of the laminated glazing unit. As an example of an acoustic sheet mention may be made of patent EP 0 844 075.

In one preferred embodiment, the lamination interlayer comprises an EVA (or PU) layer or even is solely made of EVA (or PU) since it has a good flowability.

In one preferred embodiment, the lamination interlayer comprises an, in particular acoustic, PVB layer, or even is solely made of PVB since it is preferred in the motor vehicle industry. The marginal zone of the laminated glazing unit (from the first edge face of the laminated glazing unit to the clear glass area) may comprise an (opaque) masking element such as a masking layer made of enamel which is often black (face F2 and/or F4 or else face F3 and face F4 or else F2 and/or F3) all or some of the length of the optical fibers masked by the masking element do not bear alterations (to let light out).

For example, the masking width is within a range from 1 to 20 cm, in particular from 1 to 10 cm and even from 1 to 5 cm.

It is preferred to have an enamel layer (or any other masking layer) at least on face F2. The rear opening (sliding) side window does not always have an enamel-type masking zone. The rear quarter light usually has one.

A masking layer may be a layer of black enamel, a layer of opaque ink or paint, or a layer of tinted or painted polymer (e.g. printed PVB), for example made of polyethylene or polymethyl methacrylate.

The first layer on face F2 and the one on F3 or F4 are preferably constituted of the same material and are even made of enamel.

The masking element may also be (alternately or in combination with a layer) an added-on element such as a pre-mounted seal, etc. There is usually black enamel at the periphery of a glazing unit that is not sliding but glued or encapsulated. The seal may be added on top thereof.

At the marginal zone of the laminated glazing unit, on the first edge face side or even outside of the laminated glazing unit (at the periphery of the first edge face), the luminous woven textile may be extended by a textile strip formed from warp and weft yarns separated from the (weft) optical fibers, for example over a width $I_D$ of from 0.5 to 2.5 cm. This textile strip may protect the optical fibers during incorporation into the vehicle or during various handling operations or be used during the lamination. Optionally, at the marginal zone of the laminated glazing on the side opposite the first edge face or even outside of the laminated glazing unit, the luminous woven textile may be extended by a textile strip formed from warp and weft yarns separated from the (weft) optical fibers, for example over a width $I_D$ of from 0.5 to 2.5 cm.

And at the periphery of the laminated glazing unit and of the edge face adjacent to the first edge face and devoid of optical fibers, the luminous woven textile may be extended by a textile strip formed from warp and weft yarns over a width $I'_D$ of from 0.5 to 1 cm or wider as required.

The surface area of the lamination interlayer may be smaller than the surface area of the laminated glazing unit, for example leaving a free and therefore not laminated (frame- or band-shaped) groove, of several mm, under a peripheral (enamel, etc.) opaque/masked zone.

In this groove, the optical fibers—optionally without alterations—may be spaced apart from the glazing units or in non-adhesive contact. In this groove, the textile optionally has, with the textile strip made of the woven textile without the optical fibers, a strip on top of the optical fibers (optionally without alterations) which may be spaced apart from the glazing units or in non-adhesive contact.

Preferably the warp and/or weft yarns are not all transparent in order to favor the opacity.

In one embodiment, the luminous glazing unit of a vehicle, preferably a road vehicle (car, etc.), is a (preferably panoramic) glazed roof or even a windshield, the first edge face of the laminated glazing unit is preferably a longitudinal edge face, the alterations of the (weft) optical fibers preferably being toward the second glazing pane. The first luminous surface may be solid and/or have luminous patterns.

The alterations form for example one or more luminous zones that are controlled statically, dynamically, together or individually.

The luminous zone may form an ambient light (with luminous patterns for example), a reading light, decorative or signage elements, pictograms, etc.

The glazed roof according to the invention may be opening or fixed.

Some panoramic windshields extend over an upper portion, above the driver, therefore above the front seats (or bench). The upper portion is considered to form a glazed roof according to the invention.

Preferably, the luminous glazing unit is a glazed roof (of a road vehicle preferably), the first edge face of the laminated glazing unit is preferably a longitudinal edge face, the alterations of the (weft) optical fibers preferably being toward the second glazing pane, the first luminous surface toward the second glazing pane forming at least one of the following luminous zones:

- a luminous zone comprising signage in particular as letter(s) and/or pictogram(s), in particular for the connectivity of the network, on the co-pilot or rear passenger(s) side,
- a luminous zone forming a reading light, an ambient light, on the driver and/or co-pilot side,
- a decorative luminous zone,
- a luminous zone on the driver side, or even on the co-pilot side too, capable of producing a light, the spectrum of which is adapted to combat falling asleep (bluish light of the type to induce non-visual effects), for example with a spectrum between 447 and 476 nm.

In the case of a windshield, the luminous woven textile (strip, solid luminous surface or surface with luminous patterns, etc.) may be located in the top or bottom portion and in the side (left and/or right) portion of the windshield.

In particular, the luminous glazing unit may be a windshield (of a road vehicle preferably), the first edge face of the laminated glazing unit is preferably a longitudinal edge face, the alterations of the weft optical fibers preferably being toward the second glazing pane, the first luminous surface toward the second glazing pane forming at least one of the following luminous zones:

- a luminous zone comprising signage in particular as letter(s) and/or pictogram(s), in particular for the connectivity to the communication network (Internet, etc.), on the co-pilot side,
- a luminous zone comprising, in particular on the driver side, driving assistance or warning signage, in particular regarding vehicle data (petrol, lights, etc.) or traffic, in particular as letters and/or pictograms,
- a luminous zone on the driver side, or even on the co-pilot side too, capable of producing a light, the spectrum of which is adapted to combat falling asleep (bluish light of the type to induce non-visual effects), for example with a spectrum between 447 and 476 nm.

In one configuration, the vehicle (preferably road vehicle) luminous glazing unit, in particular a glazed roof, a rear window or a windshield, the weft optical fibers also protrude from the second edge face of the laminated glazing unit on the opposite side to the first, preferably longitudinal, edge face (as bundle(s)), a second light source being connected to the second free ends of the optical fibers (grouped as bundle(s) preferably). This second light source is controlled independently or coupled with the first light source.

In one configuration, the vehicle (preferably road vehicle) laminated glazing unit forms a laminated side, preferably rear, window optionally coated with a transparent heating and/or solar-control layer (for example the layer Climacoat from Saint-Gobain, or Coolcoat from Saint-Gobain), the alterations of the (weft) optical fibers preferably being toward the second glazing pane, the first luminous surface toward the second glazing pane forming at least one of the following luminous zones:

- a luminous zone comprising signage preferably as pictogram(s) and/or letter(s), in particular for the connectivity to the network, on the rear passenger(s) side,
- a luminous zone forming a fill-in light, on the rear passenger side,
- a decorative luminous zone occupying the entire clear glass areas (alone or with signage, etc.), or the alterations of the (weft) optical fibers preferably toward the first glazing pane, the first luminous surface toward the first glazing pane forming at least one of the following luminous zones:

- a luminous zone that forms luminous—static or dynamic—signaling such as:
  - a turn signal repeater,
  - a luminous locator of the (road) vehicle when stopped, for example for detection in a parking lot (in particular with a peripheral strip or the boundary of the glazing),
  - emergency signage (pictogram(s) and/or letter(s)) in the event of breakdown or accident, for example the red exclamation point in a red triangle pictogram,
  - signage (in particular pictogram(s) and/or letter(s)) regarding the function of the (road) vehicle (taxi, police, fire vehicle, ambulance, etc.) for example a word denoting the function of the vehicle (police, fire vehicle, ambulance, etc.),
  - signage (in particular pictogram(s) and/or letter(s)) regarding the state of availability of the vehicle such as a taxi or a shared (road) vehicle, for example a word (taxi, etc.) in green (if available) or in red (if occupied),
- a decorative luminous zone (for the signature of the vehicle), for example occupying the entire clear glass area (alone or with peripheral signage, etc.).

In one configuration, the laminated glazing unit is a rear window, optionally coated with a transparent heating and/or solar control layer, the alterations of the (weft) optical fibers preferably being toward the first glazing pane, the first luminous surface toward the first glazing pane forming at least one of the following luminous zones:

- a luminous zone that forms luminous—static or dynamic—signaling or signage such as:
  - a turn signal repeater,
  - a third brake light,
  - a luminous locator of the (road) vehicle when stopped,
  - emergency signage (pictogram(s) and/or letter(s)) in the event of breakdown or an accident,
  - signage (pictogram(s) and/or letter(s)) regarding the type of (road) vehicle (taxi, police, ambulance, etc.),
  - signage (pictogram(s) and/or letter(s)) regarding the state of availability of the vehicle such as a taxi or a shared (road) vehicle,
- forward vehicle warning signage (pictogram) (regarding too short a safety distance, etc.),
- a decorative luminous zone (for the signature of the vehicle) occupying the entire clear glass area (alone or with peripheral signage, etc.).

For a decorative lighting (roof, side window, rear window, etc.) the color of the yarns may be matched to that of the bodywork or interior fittings.

According to the invention, the term dark is the opposite to luminous (to the on state). A dark zone or surface may be of any color.

The first (and/or the second) light source may comprise one or more point light sources, in particular light-emitting diodes or laser diodes, arranged opposite the free ends of optical fibers, at the edge of the woven textile. Alternatively, the first light source (and/or the second) may be extended sources such as incandescent lamps, fluorescent tubes or discharge tubes incorporating a gas such as neon arranged opposite a plurality of free ends of optical fibers.

In one advantageous embodiment, one or more sensors connected to the environment and/or to the luminous glazing unit may be associated with the first (and/or second) light source and/or with the power supply system of said glazing unit. It is possible for example to use a luminosity detector (photodiode, etc.), a temperature sensor (exterior sensor or sensor integrated into the laminated glazing unit, etc.), the sensor used controlling for example the power supply of the first (and/or second) light source via a computer or central unit. It is possible to define a sensor measurement value (maximum luminosity for example) beyond which the luminous glazing unit ceases to operate one of its functions (light extraction or activation of the light sources in particular). For a higher value for example, the power supply of the luminous glazing unit is turned off and for a lower value, the luminous glazing unit or one of its functions (for example its degree of luminosity) may be controlled via the information received from the sensor(s). The function of the luminous glazing unit may also be "forced" by the user by deactivation of the sensors.

The sensors may be in the interior (for example of the road vehicle) or on the exterior. Management of the luminous glazing unit as a function of the exterior environment makes it possible for example to automatically adapt the illuminating intensity of the glazing unit to the exterior luminosity conditions, without the user having to intervene.

In particular, the power supply of the first (and/or second) light source may for example be controlled by the central computer of the vehicle permitting them to be turned on or not depending on the information received from the light sensor placed for example in the top portion of the windshield or on a glazing unit such as a roof. Under high luminosity (day), the luminosity value exceeds the maximum value, causing the first (and/or second) light source to remain off; under conditions of low luminosity (night), the maximum value is not reached, and the activation is then carried out.

The vehicle luminous glazing unit may therefore comprise means for adjusting the power according to at least two configurations: a configuration for night vision, and a configuration for day vision.

The invention also relates to a process for manufacturing the vehicle luminous glazing unit as described above comprising a step of lamination with the woven textile, preferably between (at least) two sheets made of the lamination polymeric material, at a temperature of at most 100° C., even at most 90° C., and even at most 80° C. or at most 70° C., in order to avoid any shrinkage of the luminous woven textile, in particular when the luminous woven textile comprises organic (polymeric) optical fibers. Preferably, the first and second glazing panes are curved (bent).

In one configuration, in particular when the luminous woven textile comprises organic (polymeric) optical fibers, the lamination is carried out without autoclaving or with a suitable cycle with pressure.

In a first configuration, use is made of (at least) two solid sheets, for example made of EVA or else made of PVB, and the luminous woven textile is sandwiched directly between these two solid sheets (single sheet or stack of sheets of different tints for example or identical tints for greater thickness or customized thickness).

In a second configuration, use is made of (at least) three sheets, for example:
solid EVA sheet/central EVA sheet with a recess housing the luminous woven textile/solid EVA sheet,
solid EVA sheet(s)/central EVA sheet(s) with a recess housing the luminous woven textile/solid EVA sheet(s)/solid EVA sheet(s),
solid PVB sheet/central, in particular acoustic, PVB sheet with a recess housing the luminous woven textile/solid PVB sheet, for example one of the solid sheets is an acoustic (in particular trilayer) PVB,
solid PVB sheet(s)/central, in particular acoustic, PVB sheet(s) with a recess housing the luminous woven textile/solid PVB sheet(s), for example one of the solid sheets is an acoustic (in particular trilayer) PVB.

The recess preferably extends to the first edge face.

The present invention will be better understood and other details and advantages features of the invention will become apparent on reading examples of vehicle luminous glazing units according to the invention illustrated by the following figures:

FIG. 1 represents a schematic longitudinal cross-sectional view of a motor vehicle luminous glazing unit with a luminous woven textile, forming for example a glazed roof, in a first embodiment of the invention;

FIG. 1' represents a schematic cross-sectional view of a motor vehicle luminous glazing unit with a luminous woven textile, forming for example a glazed roof, in a second embodiment of the invention;

FIG. 1a represents a schematic side view of a motor vehicle with the luminous glazing unit from FIG. 1 in the off state;

FIG. 1b represents a schematic side view of a motor vehicle with the luminous glazing unit from FIG. 1 in the on (luminous) state;

FIG. 2a represents a schematic view of the interior of a motor vehicle, the luminous glazed roof of which comprises a luminous woven textile;

FIG. 2b represents a schematic top view of the luminous glazed roof from FIG. 2a and FIG. 2c represents a schematic top view of the luminous woven textile of the glazed roof from FIG. 2a;

FIG. 3 represents a schematic top view of a luminous woven textile according to the invention;

FIG. 3a represents a schematic top view of a vehicle luminous glazing unit forming a luminous glazed roof, with a luminous woven textile according to the invention;

FIG. 3b represents a schematic top view of a vehicle luminous glazing unit forming for example a luminous glazed roof, with a luminous woven textile according to the invention;

Figure 7A:
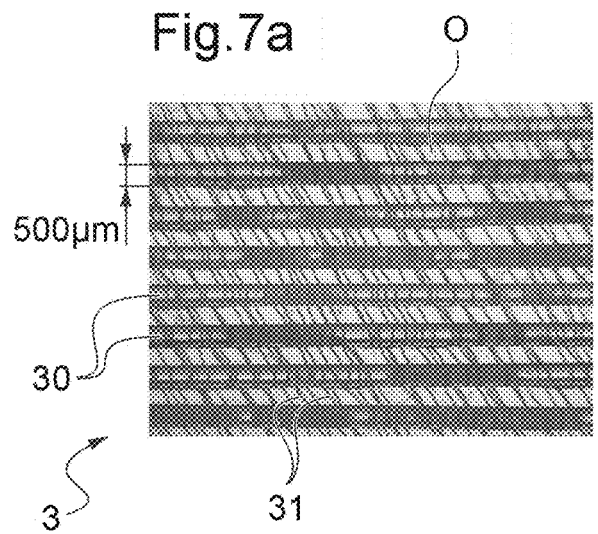
Figure 10A:
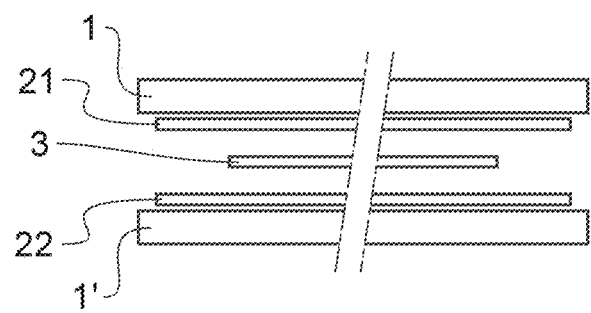
Figure 10B:
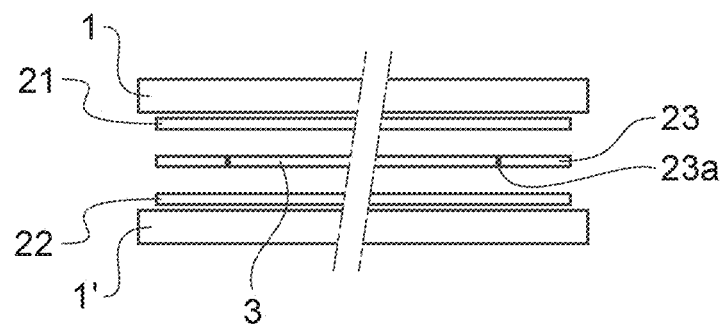
Figure 11:
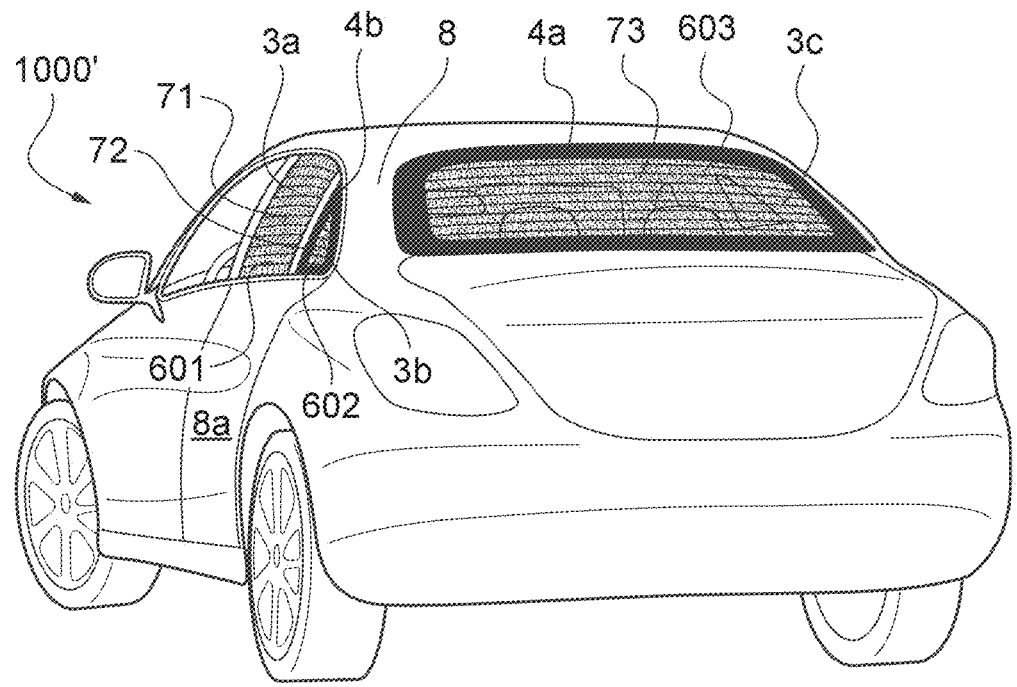
Figure 12:
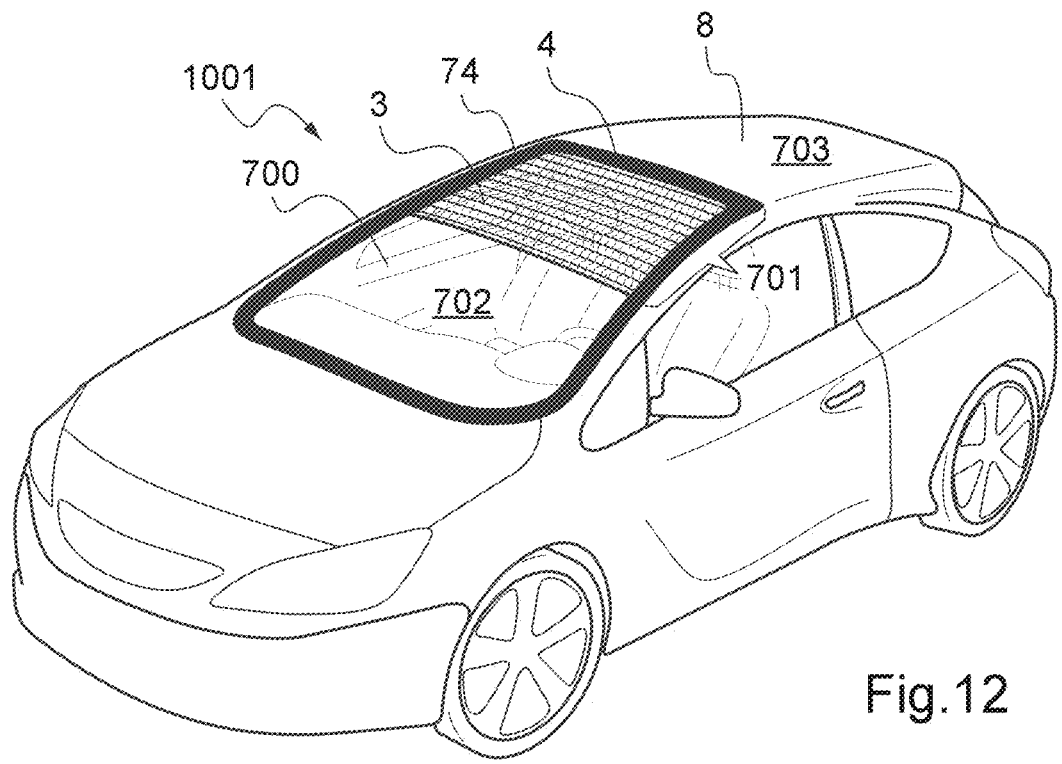

FIGS. 4a, 5a, 6a, 7a, 8a, 9a each show an optical microscope image of luminous woven textiles according to the invention and FIGS. 4b, 5b, 6b, 7b, 8b, 9b each represent a processed image of luminous woven textiles according to the invention;

FIGS. 4c et 7c each represent a histogram of the image shown respectively in FIG. 4a and FIG. 7a;

FIGS. 10a and 10b illustrate first and second methods of lamination with a luminous woven textile according to the invention;

FIG. 11 is a schematic rear and side view of a motor vehicle with luminous glazing units having luminous woven textiles according to the invention, respectively forming a rear window, a sliding rear side window and a rear quarter light;

FIG. 12 represents a schematic top and side view of a motor vehicle, the panoramic windshield of which includes a luminous woven textile according to the invention in an upper portion of the windshield forming a glazed roof.

It is specified that for the sake of clarity the various elements of the objects represented are not necessarily reproduced to scale.

FIG. 1 represents a schematic longitudinal cross-sectional view of a road vehicle (preferably car) luminous glazing unit (100) with a luminous woven textile 3, forming a glazed roof, in a first embodiment of the invention. It comprises a laminated glazing unit with main faces referred to as F1, F2, F3 and F4 on going from the exterior toward the interior of the vehicle, and comprises:

a, for example rectangular, outermost, first curved glazing pane 1 made of mineral glass, having a first main face 11 corresponding to the face F1 and a second main face 12 which is the face F2, which is preferably tinted, therefore with a composition for a tinted solar-control function such as the VENUS VG10 or TSA 4+ glass sold by Saint-Gobain Glass, having a thickness for example equal to 2.1 mm, a lamination interlayer 2, for example made of PU, EVA, or PVB, preferably having a haze of at most 1.5%, a second curved glazing pane 1', of the same dimensions as the first glazing pane, for example a sheet of clear or extra-clear soda-lime-silica glass such as Planilux or Diamant glass sold by Saint-Gobain Glass with an inner or lamination main face 13 referred to as face F3, and another main face 14 corresponding to the face F4.

The laminated glazing unit also comprises a luminous woven textile 3 comprising (polymeric and/or glass) warp yarns 31, (polymeric and/or glass) weft yarns (not shown here) and polymeric and/or glass optical fibers 30 preferably as weft.

The luminous woven textile 3 comprises a first luminous surface toward the second glazing pane, the optical fibers being capable, via alterations at least in a portion located on an exterior side (preferably toward face F3 here) of the woven textile, of emitting light sideways toward the first glazing pane (and also toward the second glazing pane). The optical fibers protrude from a first edge face of the laminated glazing unit, preferably the longitudinal edge face (not visible here) and are grouped together in one or more bundles.

A first light source (not shown), in the form of a set of LED or laser diodes (one diode per bundle), at the periphery of the laminated glazing unit is connected to the first free ends of the optical fibers.

Since the woven textile 3 has openings between the warp yarns, the weft yarns and the optical fibers, the laminated glazing unit lets a fraction of the solar radiation through via the openings and has a clarity C of at least 75% and preferably of at least 85%. The luminous woven textile has an opening factor $T_O$ of at least 5%, and even of at least 10% and preferably of at most 50%. Since the luminous woven textile has a non-zero light transmission $T_L$, the ratio $T_O/T_L$ is less than 1 and even at most 0.75 and preferably at least 0.1. The laminated glazing unit with the luminous woven textile has a haze which is of at most 45% even of at most 40%.

The optical fibers have a diameter (for example total diameter) between 100 and 1000 μm and better still from 200 to 550 μm. All or some of the weft and/or warp yarns are for example reflective, in particular metalloplastic, or tinted, in particular opaque, preferably white or black.

Preferably:
the transparent warp yarns have a yarn density of between 30 and 60 cm$^{-1}$ and a count of from 10 to 70 dtex and even from 20 to 30 dtex,
the opaque weft yarns have a yarn density of at most 25 cm$^{-1}$ and even a count of at most 300 dtex.

The luminous woven textile 3 is part of said means for occluding solar radiation, as shown in FIG. 1a.

The luminous woven textile 3 provides the lighting function (ambient light, reading light, decorative light, signage, signaling, etc.) as shown in FIG. 1b.

The luminous woven textile is in optical contact with the faces F2 and F3, being embedded in the lamination interlayer 2.

Conventionally, the glazed roof is provided with a masking frame (or at least with one or more peripheral marking strips) via two black enamel masking layers 4,4' on faces F2 and F4.

The glazed roof may be fixed or opening.

The woven textile 3 may occupy all or some of the clear glass area, as one or more strips, each preferably emerging (even protruding) from the first (longitudinal) edge face and even optionally from the second (longitudinal) edge face.

This laminated luminous glazing unit may alternatively form a panoramic windshield, a (sliding and/or rear quarter light) rear window or a (rear or even front) side window.

In FIG. 1', the vehicle luminous glazing unit 100' differs from that described in FIG. 1 by the fact that a low-emissivity layer 5 is added on face F4, for example a stack of thin layers comprising a TCO layer preferably made of ITO or of $SnO_2$:F. This layer 5 may also have an electrode zone that forms a touch button in order to activate/turn off the light function of the woven textile.

FIG. 2a represents a schematic view of the interior of a motor vehicle with a luminous glazed roof with a luminous woven textile 200 in the off state.

For an optimal anti-glare effect, it is preferred to cover the entire clear glass area of the glazed roof 200 surrounded by the masking frame 4 as shown in this FIG. 2a, which does not prevent the exterior from being clearly distinguished. The glazed roof is panoramic and extends on both sides of and above the front seats 110.

FIG. 2b represents a dramatic top view of the glazed roof from FIG. 2a indicated in which is the area of the masking frame 4, peripheral to the clear glass area 45, for example made of black enamel. The masking 42 on the windshield side is thicker than the masking 44 on the rear window side. The longitudinal maskings 41 and 43 are identical.

The longitudinal edges are curved; from the corner A on the rear window side to the corner B on the windshield side the edge is increasingly thick.

FIG. 2c represents a schematic top view of the luminous woven textile of the glazed roof from FIG. 2a and in connection with FIG. 2b.

As shown in FIG. 2c, the (weft) optical fibers of the fabric 3 emerge at the two longitudinal edge faces of the roof, here as two lots of seven (adjacent) grouped bundles 33, 33' then as two lots of seven strands 34, 34', for a double injection of light, for example via two lots of seven series of LED diodes of the same or different color. The assembly 35 or 35' of the strands 34, 34' may receive an identical or different light, optionally at the same time for light effects or to individualize the light zones. For example, the lighting is uniform over the entire clear glass area.

Under the maskings 41 and 43 and outside of the glazing unit (corner A side), the optical fibers do not have (unnecessary) invasive alterations, thus dark strips 61, 61' are formed (as dotted line in FIG. 2b) having a width lo for example of several cm. It is possible to begin the alterations under the masking as a precaution by at most 1 cm before its interior limit C. The sides 62 and 62' of the textile are preferably under the maskings 44, 42.

FIG. 3 represents a schematic top view of a connectable luminous woven textile 300 in a variant of the textile from FIG. 2c. The luminous woven textile 3 differs in that it is extended:
in the direction of the two bundles by two textile strips 61, 61' formed from warp and weft yarns separated from the optical fibers (on top of them), over a width $I_D$ of from 0.5 to 2.5 cm, textile strips preferably outside of the clear glass area (under the peripheral masking and/or outside of the laminated glazing unit),
on the sides by two textile strips 62, 62' formed from warp and weft yarns separated from the (absent) optical fibers over a width $I_A$ chosen as required, textile strips preferably outside of the clear glass area (under the peripheral masking and/or outside of the laminated glazing unit (aiming to aid the relaxation of the stresses during the lamination, or any handling operation)).

FIG. 3a represents a schematic top view of a vehicle glazing unit 400, forming for example a glazed roof, with a luminous woven textile 3 according to the invention.

In FIG. 3a, the vehicle luminous glazing unit 400 differs from that described in FIGS. 2b and 2c by the number of bundles and strands and the choice of the luminous zones.

A first bundle 33a on the driver side (here top side in the figure) is the closest to the windshield, in the clear glass area, the first luminous surface 61 of the woven textile 3 forms a reading light, or an ambient light or even a bluish light to combat falling asleep, then preferably in the driver's field of vision. On the opposite side, another first bundle 33' on the co-pilot side (here bottom side in the figure) closest to the windshield, the first luminous surface 61' of the woven textile 3 forms a reading light, or an ambient light or even a bluish light to combat falling asleep (for co-piloting, etc.). The two strands 35a and 35'a are connected to two independently controlled LED diodes (not shown).

Next to the first bundle 33a, there are three second bundles 33b on the driver side, the first luminous surface 62 of the woven textile 3 may be a reading light or an ambient light. Opposite the second bundles 33b, there are three other second bundles, the first luminous surface 62' of the woven textile 3 may be a reading light or an ambient light. The two lots of three strands 35b and 35'b are connected to two lots of three LED diodes (not shown).

Next to the three second bundles 33b on the driver side there is a single bundle 33c, the first luminous surface 62 of the woven textile 3 may be a luminous signage such as for example a pictogram for receiving an SMS or email 63a or for access to the network 63b. On the other side there is another single bundle 33'c, the first luminous surface 62' of the woven textile 3 may be in the same way a signage such as for example a pictogram for receiving an SMS or email 63c. The two strands 35c and 35'c are connected to two LED diodes (not shown).

Three last bundles 33d, at the back, are the closest to the rear window. The first luminous surface 62 of the woven textile 3 may be a decorative light 64 as an array of decorative (for example geometric) patterns 64a. On the opposite side, there are three other last bundles, the first luminous surface 62' of the woven textile 3 may also be a decorative light as an array of decorative (for example geometric) decorative patterns 64'.

The strands 35d and 35'd are connected to independently controlled diodes.

The bundles may, like here, be adjacent (connected at a point P1, P2, P3) or be spaced apart from one another.

FIG. 3b shows an example of a vehicle luminous glazing unit 500 with two parts 3a and 3b of luminous woven textiles, the first luminous surfaces of which 501 and 502 are separated, for example an ambient light. For example, use is made of two lots of three bundles 33, 33' joined together as strands 35, 35'.

The luminous zones 501 and 502 are spaced apart by a zone 503, referred to as a dark (non-luminous) zone which is a portion of the woven textile made of a part, the optical fibers of which are not connected to a diode (but could be) or alternatively are cut on leaving the edge face. The zone 503 may also be a textile-free zone optionally with additional occluding means.

EXAMPLES

Six examples of vehicle luminous laminated glazing units, for example for road vehicle panoramic glazed roofs, numbered 1, 1a, 2, 3, 4, 5 and two additional examples A and B are produced.

The first glazing pane (for the exterior) is a 2.1 mm VG10 tinted glass, the lamination interlayer is formed from two lots of three PU sheets, each 0.76 mm, surrounding the woven textile. The second glazing pane (for the interior) is a 2.1 mm Planilux glass.

The optical fibers are weft fibers and protrude from the longitudinal edge face.

The length of the fabric along the axis of the optical fiber is 30 cm.

Table 1a lists the features of the yarns and optical fibers (OF) of the preferred woven textiles according to the invention.

The optical fibers (referred to as OF) are fibers with a PMMA core and a fluoropolymer cladding having a thickness of the order of 10 to 15 μm.

The alterations of the optical fibers are placed on the (interior) clear second glazing pane side.

The strands of 500 μm optical fibers contain 150 optical fibers. The strands of 250 μm optical fibers contain 510 optical fibers approximately.

The diodes are OSRAM Golden DRAGON® Plus 6500K powered at 700 mA.

TABLE 1a

| Ex. | Warp yarn | Weft yarn | Weft yarn density ($cm^{-1}$)/ warp yarn density ($cm^{-1}$) | OF diameter (μm) | OF density ($cm^{-1}$) | OF/weft distribution | Warp yarn and OF weave/ Warp yarn and weft yarn weave |
|---|---|---|---|---|---|---|---|
| 1 | transparent 22 dtex polyester | white Trevira CS 167 dtex polyester | 15/44 | 500 | 15 | 1/1 | 16-harness satin/taffeta |
| 1a | transparent 22 dtex polyamide | silver 115 dtex lurex | 7.5/55 | 500 | 7.5 | 1/1 | 16-harness satin/taffeta |
| 2 | transparent 22 dtex polyester | white 56 dtex polyester | 22.5/44 | 500 | 7.5 | 1/3 | 16-harness satin/taffeta |
| 3 | transparent 22 dtex polyester | white 56 dtex polyester | 20/44 | 500 | 10 | 2/1 | reps 3-1/ reps 3-1 |
| 4 | transparent 22 dtex polyester | white 56 dtex polyester | 20.5/44 | 250 | 20.5 | 1/1 | 20-harness satin/5-harness satin |
| 5 | transparent 22 dtex polyester | white 56 dtex polyester | 15/44 | 250 | 15 | 1/1 | 16-harness satin/taffeta |

Table 1b lists the features of the yarns and optical fibers (OF) of the additional woven textiles.

TABLE 1b

| Ex. | Warp yarn | Weft yarn | Weft yarn density/ warp yarn density ($cm^{-1}$) | OF diameter (μm) | OF density ($cm^{-1}$) | OF/ weft distribution | Warp yarn and OF weave/ Warp yarn and weft yarn weave |
|---|---|---|---|---|---|---|---|
| A | transparent 22 dtex polyester | transparent 22 dtex polyester | 15/55 | 500 | 15 | 1/1 | 16-harness satin/taffeta |
| B | white Trevira CS 167 dtex polyester | transparent 22 dtex polyamide | 15/55 | 500 | 15 | 1/1 | 16-harness satin/taffeta |

Table 2 presents the performances of the woven textiles according to the invention before lamination.

TABLE 2

| Ex. | L1 (Cd/m$^2$) | L2 (Cd/m$^2$) | $T_L$ (%) | C (%) | H (%) | $T_E$ (%) | $R_E$1 (%) | $R_E$2 (%) | $T_O$ (%) | $T_O/T_L$ | Thickness (mm) |
|---|---|---|---|---|---|---|---|---|---|---|---|
| 1 | 147 | 87 | 56 | 95 | 74 | 49 | 42 | 42 | 15 | 0.3 | 0.7 |
| 1a | 64 | 33 | 60 | 97 | 40 | 53 | 39 | 34 | 39 | 0.7 | 0.6 |
| 2 | 28 | 25 | 84 | 95 | 61 | 68 | 26 | 20 | 28 | 0.3 | 0.5 |
| 3 | 51 | 45 | 81 | 97 | 58 | 71 | 26 | 26 | 31 | 0.4 | 0.6 |
| 4 | 33 | 26 | 82 | 92 | 70 | 70 | 29 | 26 | 23 | 0.3 | 0.3 |
| 5 | 18 | 14 | 85 | 96 | 55 | 78 | 20 | 21 | 35 | 0.4 | 0.3 |

Table 2' presents the performances of the additional woven textiles before lamination. Lum1 is measured on the F4 (clear second glazing pane) side, Lum2 on the F1 (tinted first glazing pane) side.

TABLE 2'

| Additional ex. | Lum 1 (Cd/m$^2$) | Lum 2 (Cd/m$^2$) | $T_L$ (%) | C (%) | H (%) | $T_E$ (%) | $R_E$1 (%) | $R_E$2 (%) | Thickness (mm) |
|---|---|---|---|---|---|---|---|---|---|
| A | 146 | 201 | 77 | 91 | 81 | | | | |
| B | 300 | 124 | 36 | 3 | 103 | 24 | 60 | 66 | 0.8 |

Table 3 presents the technical data of the laminated glazing units with the woven textiles according to the invention, of the glazing units with the additional textiles A and B and of an identical laminated glazing unit with no luminous woven textile.

TABLE 3

| Example | OF diameter (µm) | TL (%) | C (%) | H (%) | $T_E$ (%) | $R_E$ int (%) | $R_E$ ext (%) |
|---|---|---|---|---|---|---|---|
| 1 | 500 | | | | | | |
| 1a | 500 | 17 | 92 | 30 | 10 | 18 | 5 |
| 2 | 500 | | | | | | |
| 3 | 500 | | | | | | |
| 4 | 250 | 19 | 90 | 36 | 11 | 10 | 5 |
| 5 | 250 | 21 | 91 | 31 | 12 | 10 | 5 |
| Glazing unit with no textile | — | 27 | 99 | 4 | 12 | 4 | 5 |
| A | 500 | 19 | 85 | 48 | | | |
| B | 500 | 4 | 0 | 100 | 2 | 36 | 6 |

The products 1 to 5 have high clarity (and low haze). It is estimated that their luminance is more or less equal to the luminance of the textile alone times the light transmission of the laminated glazing unit alone (to within 5%). The product A, according to the invention, has an acceptable clarity but a rather high haze. The product B is a comparative example because it is too opaque.

FIG. 4a shows an image in transmission (on the alterations side) and in grayscale, taken with an optical microscope, of the woven fabric (alone) of example 1. The optical fibers 30, which are rectilinear and parallel to one another and regularly spaced out, the warp yarns 31, which are rectilinear and substantially parallel to one another (and perpendicular to the optical fibers), and the openings O between yarns and fibers are distinguished. The distance between two neighboring optical fibers is smaller than the diameter of the optical fiber. The weft yarns are masked probably by the optical fibers.

It is observed that the openings are quadrilaterals, for the most part rectangular with a small side along the normal to the optical fibers and a large side along the axis of the optical fibers.

FIG. 4b is the image of example 1 after digital processing. A histogram is produced (shown in FIG. 4c) of the image in grayscale (X being the gray level and Y being the number of pixels). Two humps N and B are distinctly observed. A threshold S is set between these two humps—corresponding to the minimum number of pixels in this zone starting from which it is considered that the pixel is white (or black). The number of white pixels (corresponding to the openings between yarns and fibers) and of black pixels are then counted and the opening factor $T_O$ is deduced therefrom.

A similar opening factor $T_O$ would be obtained by image processing (in reflection on the clearest glazing pane side) carried out after lamination.

FIG. 5a shows an image in transmission and in grayscale, taken with an optical microscope, of the woven fabric (alone) of example 1a. The optical fibers 30, which are rectilinear and parallel to one another and regularly spaced out (more spaced out than in example 1), the warp yarns 32, which are looser (curved not rectilinear trajectory) having an angle of 90°±40° with the normal to the optical fibers, sometimes as strands of at most 10 yarns, and the openings O are distinguished. The distance between two neighboring optical fibers is greater than the diameter of the optical fiber. The weft yarns are masked probably by the optical fibers.

It is observed that the openings are quadrilaterals. The size distribution of the openings is broader than in example 1.

In a manner similar to example 1, a histogram of the image in grayscale and a thresholding are produced. FIG. 5b is an image of example 1bis after this digital processing.

FIG. 6a shows an image in transmission and in grayscale, taken with an optical microscope, of the woven fabric (alone) of example 2. The optical fibers 30, which are rectilinear and parallel to one another and regularly spaced out, the warp yarns 31, which are rectilinear and substantially parallel to one another (and perpendicular to the optical fibers), and the openings O between yarns and fibers are distinguished. The distance between two neighboring optical fibers is greater than the diameter of the optical fiber. Between neighboring optical fibers, two weft yarns 32 are visible, which are substantially rectilinear and parallel to one another.

It is observed that the openings are quadrilaterals, for the most part rectangular, close to being square, with a small side along the normal to the optical fibers and a large side along the axis of the optical fibers.

In a manner similar to example 1, a histogram of the image in grayscale and a thresholding are produced in order to calculate $T_O$. FIG. 6b is an image of example 2 after this digital processing.

FIG. 7a shows an image in transmission and in grayscale, taken with an optical microscope, of the woven fabric (alone) of example 3. The optical fibers 30, which are rectilinear and parallel to one another and regularly spaced out, the warp yarns 32, which are rectilinear and substantially parallel to one another (and that form an angle of around 60° relative to the axis of the optical fibers) and that are unequally spaced apart, and the openings O between yarns and fibers are distinguished. The distance between two neighboring optical fibers is slightly greater than the diameter of the optical fiber. The weft yarns are masked probably by the optical fibers.

It is observed that the openings are quadrilaterals, for the most part rectangular, of convex type; with one side oblique to the optical fibers and one side along the axis of the optical fibers.

Figure 7B:
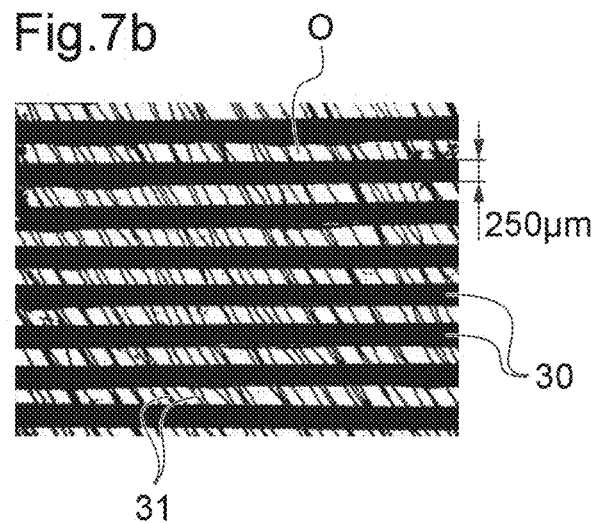
Figure 7C:
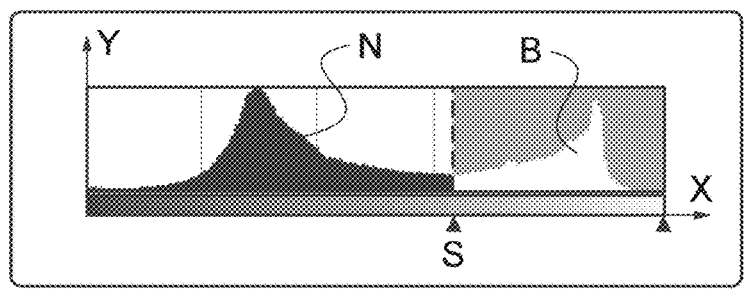

In a manner similar to example 1, a histogram, shown in FIG. 7c, and a thresholding are produced in order to calculate $T_O$. FIG. 7b is an image of example 3 after this digital treatment.

FIG. 8a shows an image in transmission and in grayscale, taken with an optical microscope, of the woven fabric (alone) of example 4. The optical fibers 30, which are rectilinear and parallel to one another and regularly spaced out, the warp yarns 32, which are rectilinear and substantially parallel to one another (and perpendicular to the optical fibers), and the openings O between yarns and fibers are distinguished.

Between neighboring optical fibers, a weft yarn 31 is visible.

It is observed that the openings are quadrilaterals, for the most part rectangular.

In a manner similar to example 1, a histogram and a thresholding are produced in order to calculate $T_O$. FIG. 8b is an image of example 4 after this digital processing.

FIG. 9a shows an image in transmission and in grayscale, taken with an optical microscope, of the woven fabric (alone) of example 5. The optical fibers 30, which are rectilinear and parallel to one another and regularly spaced out, the warp yarns 31, which are rectilinear and substantially parallel to one another (and perpendicular to the optical fibers), and the openings O are distinguished. Between visible neighboring optical fibers, a weft yarn 32 is visible. The weft yarns 32 are substantially rectilinear and parallel to one another and to the optical fibers.

It is observed that the openings are quadrilaterals, for the most part rectangular.

In a manner similar to example 1, a histogram and a thresholding are produced in order to calculate $T_O$. FIG. 9b is an image of example 5 after this digital processing.

FIGS. 10a and 10b illustrate first and second methods of lamination with the luminous woven textile according to the invention.

In a first configuration (FIG. 10a), use is made of two solid sheets 21 and 22, for example made of EVA and the woven textile 3 is sandwiched directly between these two solid sheets.

In a second configuration (FIG. 10b), use is made of two solid sheets 21 and 22, for example made of EVA and a central sheet 23, also made of EVA, with a recess 23a housing the woven textile 3.

FIG. 11 is a schematic rear and side view of a motor vehicle 1000' with luminous glazing units having luminous woven textiles according to the invention, respectively forming:

a luminous sliding rear side window 601, without peripheral masking, the first luminous surface of the woven textile 3a forming a decorative lighting 71 toward the exterior over the entire clear glass area, the ends of the optical fibers and the light source being housed in the door, a rear quarter light 602 with a peripheral masking 4b (frame), the first luminous surface of the woven textile 3b forming a decorative lighting 72 toward the exterior over the entire clear glass area, the ends of the optical fibers and the light source being housed in the door, and a rear window 603 with a peripheral masking 4a (frame), the first luminous surface of the woven textile 3c forming a decorative lighting 73 toward the exterior over the entire clear glass area or as a variant over a lateral or longitudinal edge. The roof is for example made of sheet metal 8.

FIG. 12 represents a schematic top and side view of a motor vehicle 1001, the panoramic windshield 700 of which includes a luminous woven textile 3 according to the invention in an upper portion 701 of the windshield forming a fixed glazed roof. The other portion of the roof 703 may be made of sheet metal 8. The first luminous surface of the woven textile 3a forming a lighting 74 toward the exterior while being used as occluding means in the off state.

The lower portion 702 of the clear glass area may incorporate other functions such as a head-up display (HUD), etc.

The invention claimed is:

1. A vehicle luminous glazing unit comprising:
   a laminated glazing unit comprising:
      a first glazing pane, made of mineral glass, with a first main face intended to be on an exterior side of the vehicle, and an opposite second main face,
      a lamination interlayer made of polymeric material, on the second main face,
      a second glazing pane, made of mineral glass, with a third main face on the lamination interlayer and an opposite fourth main face intended to be on an interior side of the vehicle,
   a first light source at a periphery of the laminated glazing unit,
   an occluding system configured to occlude solar radiation, wherein the laminated glazing unit comprises, between the second main face and the third main face, a luminous woven textile comprising warp yarns, weft yarns and optical fibers as weft and/or as warp,
   wherein the luminous woven textile comprises a first and/or a second luminous surface toward the first and/or the second glazing pane, the optical fibers being capable, via alterations at least in a portion located on an exterior side of the woven textile, of emitting light sideways toward the first and/or the second glazing pane, all or some of the optical fibers protruding from a first edge face of the laminated glazing unit, and the light source is connected to a first free ends of the optical fibers,
   wherein the luminous woven textile has openings between the warp yarns, the weft yarns and the optical fibers, the laminated glazing unit letting a fraction of the solar radiation through via the openings and has a clarity of at least 75%,
   wherein the luminous woven textile is part of said occluding system,
   and wherein the luminous woven textile is in optical contact with the second main and third main faces.

2. The vehicle luminous glazing unit as claimed in claim 1, wherein the luminous woven textile has an opening factor $T_O$ of at least 5%.

3. The vehicle luminous glazing unit as claimed in claim 2, wherein since the luminous woven textile has a non-zero light transmission $T_L$, the ratio $T_O/T_L$ being less than 1.

4. The vehicle luminous glazing unit as claimed in claim 1, wherein the laminated glazing unit with the luminous woven textile has a haze which is of at most 45%.

5. The vehicle luminous glazing unit as claimed in claim 1, wherein the optical fibers have a diameter of between 100 and 1000 µm.

6. The vehicle luminous glazing unit as claimed in claim 1, wherein the optical fibers have a diameter of from 200 to 300 µm, for a density of 5 to 21 optical fibers/cm or wherein the optical fibers have a diameter of from 450 to 550 µm for a density of at least 5 optical fibers/cm and of at most 15 optical fibers/cm.

7. The vehicle luminous glazing unit as claimed in claim 1, wherein all or some of the weft and/or warp yarns are reflective, or tinted.

8. The vehicle luminous glazing unit as claimed in claim 7, wherein all or some of the weft and/or warp yarns are metallized or metalloplastic or tinted opaque.

9. The vehicle luminous glazing unit as claimed in claim 1, wherein:
the warp yarns have a yarn density of between 30 and 60 $cm^{-1}$ and/or a count of 10 to 70 dtex,
and/or the weft yarns have a yarn density of at most 25 $cm^{-1}$.

10. The vehicle luminous glazing unit as claimed in claim 1, wherein:
one of the first, second, third and fourth main faces of the laminated glazing unit is coated with a low-emissivity layer,
and/or the first and/or the second glazing pane is tinted,
and/or the lamination interlayer is tinted over all or part of its thickness.

11. The vehicle luminous glazing unit as claimed in claim 1, wherein the fourth main face of the laminated glazing unit is coated with a transparent functional layer, one zone of which forms a touch button.

12. The vehicle luminous glazing unit as claimed in claim 1, wherein the lamination interlayer comprises an EVA layer.

13. The vehicle luminous glazing unit as claimed in claim 1, wherein the lamination interlayer comprises a PVB layer.

14. The vehicle luminous glazing unit as claimed in claim 1, wherein a marginal zone of the laminated glazing comprises a masking element, and wherein all or some of the length of the optical fibers masked by the masking element do not bear alterations.

15. The vehicle luminous glazing unit as claimed in claim 1, wherein at the marginal zone of the laminated glazing unit, on the first edge face side, the luminous woven textile is extended by a textile strip formed from warp and weft yarns separated from the optical fibers.

16. The vehicle luminous glazing unit as claimed in claim 1, wherein the luminous glazing unit is a glazed roof or a windshield.

17. The vehicle luminous glazing unit as claimed in claim 1, wherein the luminous glazing unit is a glazed roof, the first luminous surface being toward the second glazing pane and forming at least one of the following luminous zones:
a luminous zone comprising luminous signage, on the co-pilot or rear passenger(s) side,
a luminous zone forming a reading light, an ambient light, on the driver and/or co-pilot and/or rear passenger(s) side,
a luminous zone on the driver side, or on the co-pilot side, capable of producing a light, the spectrum of which is adapted to combat falling asleep,
a decorative luminous zone.

18. The vehicle luminous glazing unit as claimed in claim 1, wherein, the weft optical fibers also protrude from a second edge face of the laminated glazing unit on the opposite side to the first, a second light source being connected to a second free ends of the optical fibers.

19. The vehicle luminous glazing unit as claimed in claim 1, forming a laminated side window, optionally coated with a transparent heating and/or solar-control layer,
the first luminous surface being toward the second glazing pane and forming at least one of the following luminous zones:
a luminous zone comprising luminous signage, on the rear passenger(s) side,
a luminous zone forming a fill-in light, on the rear passenger side,
a decorative luminous zone,
and/or wherein, the first luminous surface being toward the first glazing pane and comprising at least one of the following luminous zones:
a luminous zone that forms luminous signaling or signage
a decorative luminous zone.

20. The vehicle luminous glazing unit as claimed in claim 1, forming a rear window optionally coated with a transparent heating and/or solar control layer, and wherein the first luminous surface being toward the first glazing pane and comprising a luminous zone that forms luminous signaling, a luminous locator of the vehicle when stopped, emergency signage, signage regarding the type of vehicle, signage regarding the state of availability of the vehicle such as a taxi or a shared vehicle, a third brake light, or a warning signage.

21. A process for manufacturing the vehicle luminous glazing unit as defined in claim 1, comprising laminating the woven textile with said polymeric material, at a temperature of at most 100° C.

* * * * *